United States Patent
Lu et al.

(10) Patent No.: US 11,234,213 B2
(45) Date of Patent: Jan. 25, 2022

(54) MACHINE-TO-MACHINE (M2M) INTERFACE PROCEDURES FOR ANNOUNCE AND DE-ANNOUNCE OF RESOURCES

(71) Applicant: IoT Holdings, Inc., Wilmington, DE (US)

(72) Inventors: Guang Lu, Thornhill (CA); Rocco Di Girolamo, Laval (CA); Paul L. Russell, Jr., Pennington, NJ (US); Ana Lucia A. Pinheiro, Beaverton, OR (US); Jean-Louis Gauvreau, La Prairie (CA); Dale N. Seed, Allentown, PA (US); Nicholas J. Podias, Brooklyn, NY (US); Michael F. Starsinic, Newtown, PA (US)

(73) Assignee: IoT Holdings, Inc., Wilmington, DE (US)

( * ) Notice: Subject to any disclaimer, the term of this patent is extended or adjusted under 35 U.S.C. 154(b) by 0 days.

(21) Appl. No.: 15/909,252

(22) Filed: Mar. 1, 2018

(65) Prior Publication Data

US 2018/0192395 A1 Jul. 5, 2018

Related U.S. Application Data

(63) Continuation of application No. 13/988,310, filed as application No. PCT/US2011/061401 on Nov. 18, 2011, now abandoned.

(Continued)

(51) Int. Cl.
*H04W 72/00* (2009.01)
*H04W 4/70* (2018.01)

(52) U.S. Cl.
CPC .......... *H04W 72/00* (2013.01); *H04W 4/70* (2018.02)

(58) Field of Classification Search
CPC .................. H04W 4/005; H04L 67/16
(Continued)

(56) References Cited

U.S. PATENT DOCUMENTS 745,808 A 12/1903 Fair et al.
7,349,980 B1 3/2008 Darugar et al.
(Continued)

FOREIGN PATENT DOCUMENTS

CN 101635735 A 1/2010
CN 101719960 A 6/2010
(Continued)

OTHER PUBLICATIONS

L. Liu, M. Gaedke and A. Koeppel, "M2M interface: a Web services-based framework for federated enterprise management," IEEE International Conference on Web Services (ICWS'05), Orlando, FL, 2005, p. 774, doi: 10.1109/ICWS.2005.72. (Year: 2005).*
(Continued)

*Primary Examiner* — Tonia L Dollinger
*Assistant Examiner* — Jonathan A Sparks
(74) *Attorney, Agent, or Firm* — Volpe Koenig

(57) ABSTRACT

Systems, methods, and instrumentalities are disclosed to propagate announcement and de-announcement of a resource across one or more networks. A first entity, which may be a hosting service capability layer (SCL), may receive a request from an issuer to announce a resource. The first entity may create a representation of the resource. The representation may be referred to as an announced resource. The first entity may send an announce resource request to a second entity (e.g., an announced-to SCL), which may be registered with the first entity. The announce resource request may be sent over an mId interface. The first entity (Continued)

may receive a first response from the second entity over the mId interface indicating that the second entity created the announced resource.

42 Claims, 19 Drawing Sheets

Related U.S. Application Data

(60) Provisional application No. 61/415,460, filed on Nov. 19, 2010, provisional application No. 61/431,212, filed on Jan. 10, 2011.

(58) Field of Classification Search
USPC .......................................................... 709/206
See application file for complete search history.

(56) References Cited

U.S. PATENT DOCUMENTS

| | | | |
|---|---|---|---|
| 7,458,082 B1 | 11/2008 | Slaughter et al. | |
| 7,631,033 B2 | 12/2009 | Zehler | |
| 8,898,162 B2 | 11/2014 | Ganis et al. | |
| 2002/0178214 A1 | 11/2002 | Brittenham et al. | |
| 2002/0194256 A1* | 12/2002 | Needham | H04L 67/104 709/201 |
| 2003/0074402 A1* | 4/2003 | Stringer-Calvert | H04L 67/16 709/203 |
| 2003/0093496 A1 | 5/2003 | O'Connor et al. | |
| 2003/0121889 A1 | 7/2003 | Takahashi et al. | |
| 2003/0182392 A1 | 9/2003 | Kramer | |
| 2003/0204582 A1 | 10/2003 | Shimoda et al. | |
| 2004/0136027 A1 | 7/2004 | Zehler | |
| 2005/0027871 A1 | 2/2005 | Bradley et al. | |
| 2005/0128958 A1 | 6/2005 | Hamdan | |
| 2006/0067209 A1 | 3/2006 | Sheehan et al. | |
| 2006/0080316 A1* | 4/2006 | Gilmore | G06F 17/30864 |
| 2006/0146991 A1 | 7/2006 | Thompson et al. | |
| 2006/0173963 A1 | 8/2006 | Roseway et al. | |
| 2007/0011226 A1 | 1/2007 | Hinni et al. | |
| 2007/0136603 A1* | 6/2007 | Kuecuekyan | G06F 21/6218 713/185 |
| 2008/0009280 A1 | 1/2008 | Ushiki et al. | |
| 2008/0178278 A1 | 7/2008 | Grinstein et al. | |
| 2009/0217348 A1 | 8/2009 | Salmela et al. | |
| 2011/0182205 A1* | 7/2011 | Gerdes | H04L 67/2876 370/254 |
| 2012/0047558 A1 | 2/2012 | Sundaram et al. | |
| 2012/0059882 A1 | 3/2012 | Stark et al. | |

FOREIGN PATENT DOCUMENTS

| | | |
|---|---|---|
| CN | 101854623 A | 10/2010 |
| JP | 2003-533766 A | 11/2003 |
| JP | 2005-517247 A | 6/2005 |
| JP | 2008-017318 A | 1/2008 |
| WO | WO 2001/084620 A1 | 11/2001 |
| WO | WO 2001/086420 A2 | 11/2001 |
| WO | WO 2003/067493 A1 | 8/2003 |
| WO | WO 2011/112683 A1 | 9/2011 |

OTHER PUBLICATIONS

3rd Generation Partnership Project (3GPP), S2-096571, "A Control Plane Architecture for Machine-Type Communications", LG Electronics, TSG SA WG2 Meeting #76, San Jose Del Cabo, Mexico, Nov. 16-20, 2009, pp. 1-9.

3rd Generation Partnership Project (3GPP), SP-100452, "Standardization of Machine-Type Communications", MCC, 3GPP TSG CT Meeting #49, San Antonio, US, Sep. 14-23, 2010, 6 pages.

European Telecommunications Standards Institute (ETSI), TS 102 690 V0.5.1, "Machine-to-Machine Communications (M2M), Functional Architecture", Feb. 2010, pp. 1-100.

European Telecommunications Standards Institute (ETSI), TS 102 690 V1.1.1, "Machine-to-Machine Communications (M2M), Functional Architecture", Oct. 2011, pp. 1-280.

European Telecommunications Standards Institute (ETSI), TS 102 690 V0.1.3, "Machine-to-Machine Communications (M2M), Functional Architecture", Feb. 2010, 3 pages.

European Telecommunications Standards Institute (ETSI), TS 102 690 V0.6.2, "Machine-to-Machine Communications (M2M), Functional Architecture", Jul. 2010, 116 pages.

European Telecommunications Standards Institute(ETSI), TS 102 690 V0.8.1, "Machine-to-Machine communications (M2M), Functional Architecture", Nov. 2010, 173 pages.

Freiman et al., "LX4211, An SGLT2 Inhibitor, Shows Rapid and Significant Improvement in Glycemic Control Over 4 Weeks in Patients with Type 2 Diabetes Mellitus", Endocrine Reviews [Online], Supplement 1, Jun. 22, 2010, 1 page.

M2M, "Procedures in Functional Architecture", Document No. M2M(10)0362r2, Telefon AB LM Ericsson, Telecom Italia, Nov. 4, 2010, 14 pages.

Shelby, Z., "CoRE Link Format", Draft-letf-Core-Link-Format-01, Internet-Draft, Intended Status: Standards Track, Oct. 25, 2010, pp. 1-12.

European Telecommunications Standards Institute (ETSI), Draft ETSI TS 102 690 V0.9.6, "Machine-to-Machine Communications (M2M), Functional Architecture," Dec. 2010, 173 pages.

* cited by examiner

MACHINE-TO-MACHINE (M2M) INTERFACE PROCEDURES FOR ANNOUNCE AND DE-ANNOUNCE OF RESOURCES

CROSS-REFERENCE TO RELATED APPLICATIONS

This application is a continuation application of U.S. Non-Provisional patent application Ser. No. 13/988,310, filed Aug. 30, 2013, which is the National Stage of International Application No. PCT/US2011/061401, filed Nov. 18, 2011, which claims the benefit of U.S. Provisional Patent Application No. 61/415,460, filed on Nov. 19, 2010 and U.S. Provisional Patent Application No. 61/431,212, filed on Jan. 10, 2011, the contents of which are hereby incorporated by reference herein.

BACKGROUND

M2M communication may refer to inter-machine communication wherein human intervention may be unnecessary. M2M communication has been incorporated into various applications already and is expected to play a role in several future applications as well. Some examples of such applications include smart metering, home automation, eHealth, and fleet management.

M2M communication may be carried out by machine type communication (MTC) entities. Examples of MTC entities may include: an MTC device, an MTC server, an MTC user, an MTC subscriber, etc. An example of an MTC device may be a user equipment (UE) equipped for MTC communication. An example of an MTC server may be an entity that communicates with one or more MTC devices through a network. An example of an MTC subscriber may be a service provider providing M2M service to one or more MTC users. The MTC server may operate as an interface between the network and an MTC user.

Performance of MTC entities may depend upon how network resources are used. Currently, there are problems in efficiently managing such resources.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Systems, methods, and instrumentalities are disclosed to propagate announcement of a resource across one or more networks. A first entity, which may be a hosting service capability layer (SCL), may receive a request from an issuer to announce a resource. For example, the issuer may send the request to the first entity in order to announce resources to other SCL's. The first entity may create a representation of the resource. The representation may be referred to as an announced resource. The announced resource may include one or more of the following: a search string, an attribute, or a URI of the resource upon which the representation is based. The first entity may send an announce resource request to a second entity (e.g., an announced-to SCL), which may be registered with the first entity. The announce resource request may be sent over an mId interface. The first entity may receive a first response from the second entity over the mId interface indicating that the second entity created the announced resource.

The first entity may determine that the second entity is an entity to announce to based on accessibility of the resource. The first entity may post the announced resource to the second entity under a known Uniform Resource Identifier (URI). The first entity may send a second response to the issuer indicating that the second entity created the announced resource (e.g., after receiving the first response). The first entity may determine a plurality of SCL's to announce to. The first entity may be connected to many SCL's and may choose the plurality as a subset of the many SCL's based on security restraints, access control, etc.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments may now be described with reference to the Figures. However, while the present invention may be described in connection with exemplary embodiments, it is not limited thereto and it is to be understood that other embodiments may be used or modifications and additions may be made to the described embodiments for performing the same function of the present invention without deviating therefrom. In addition, the figures may illustrate call flows, which are meant to be exemplary. It is to be understood that other embodiments may be used. The order of the flows may be varied where appropriate. Also, flows may be omitted if not needed and additional flows may be added.

Figure 1A:
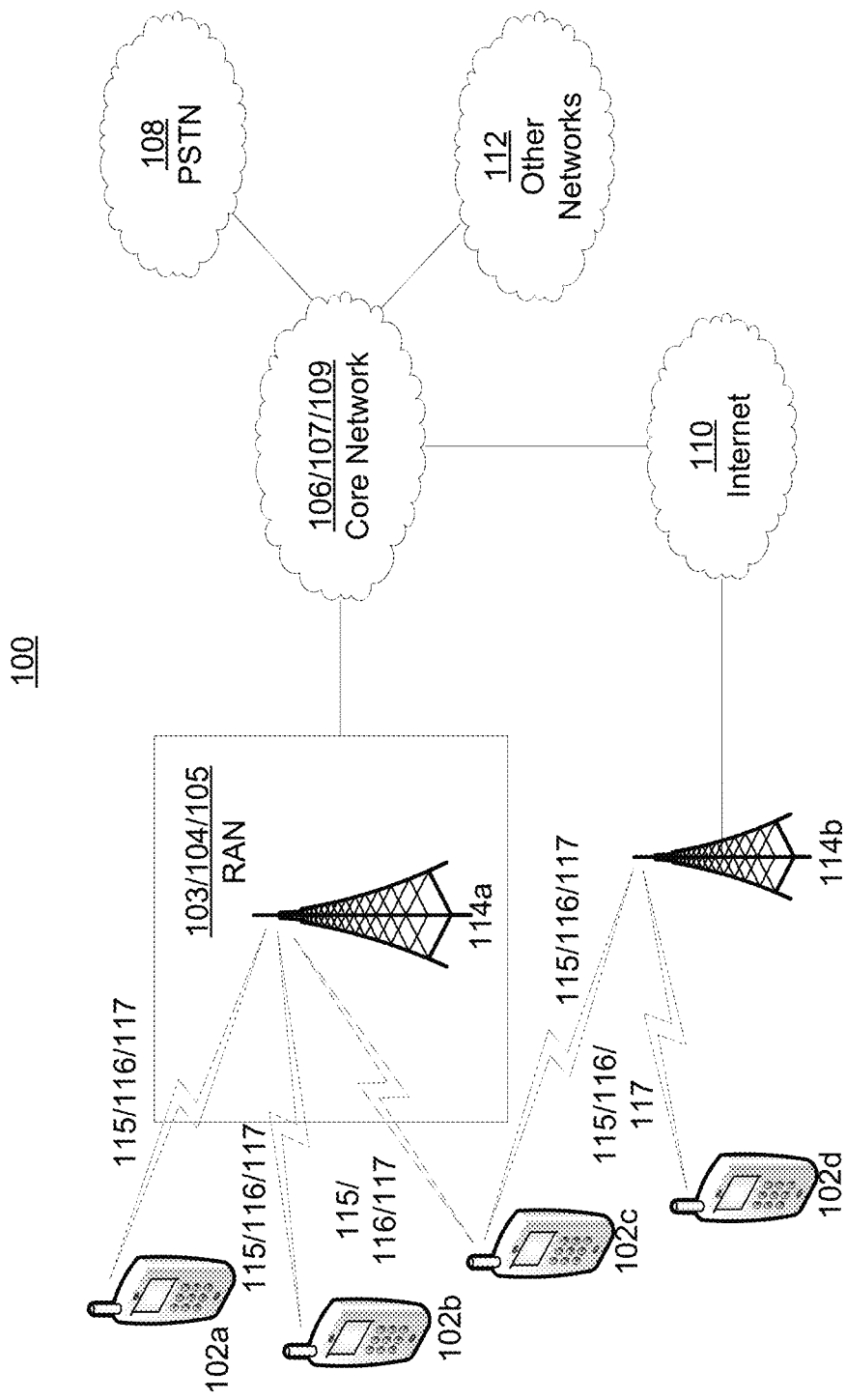
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
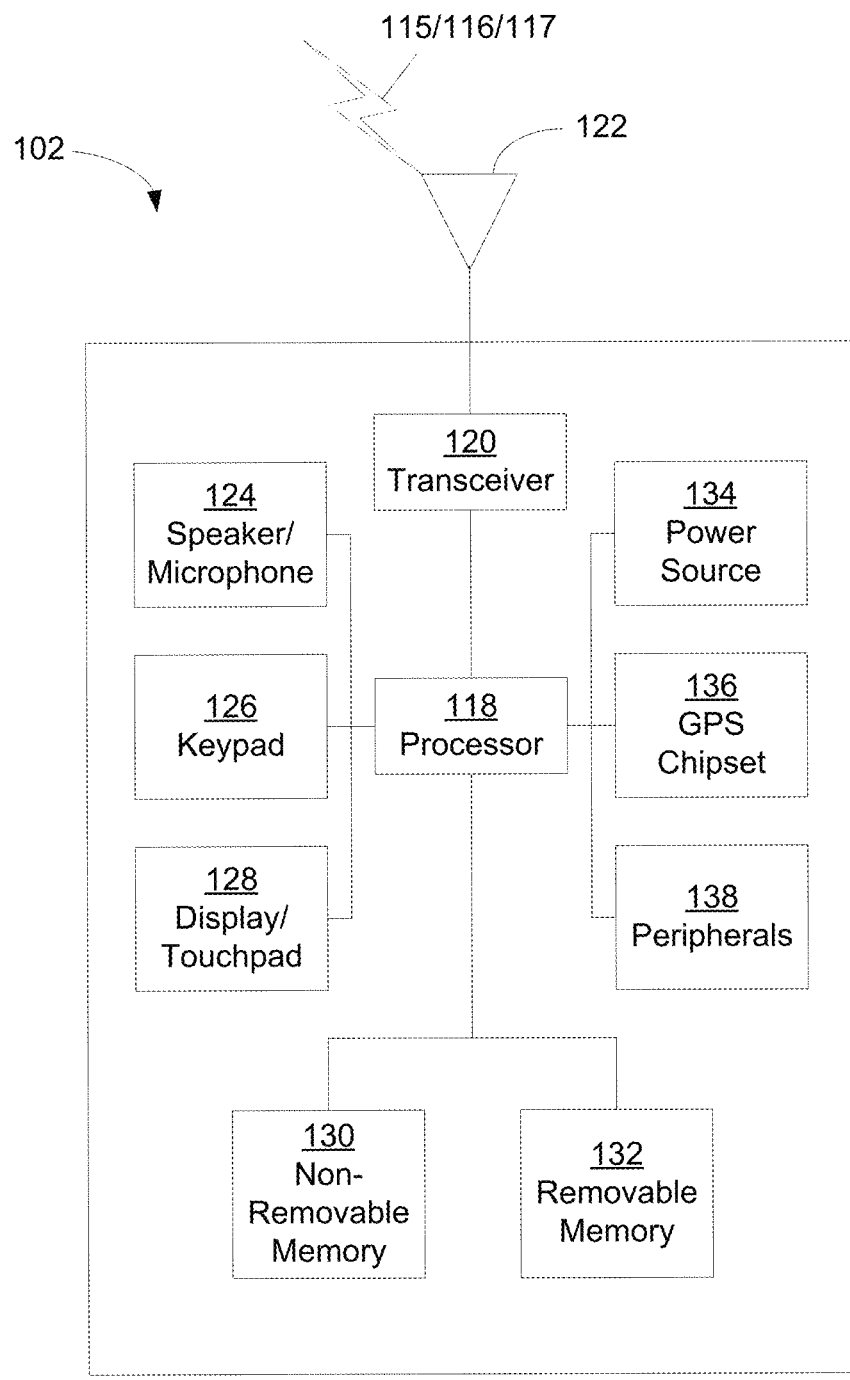
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
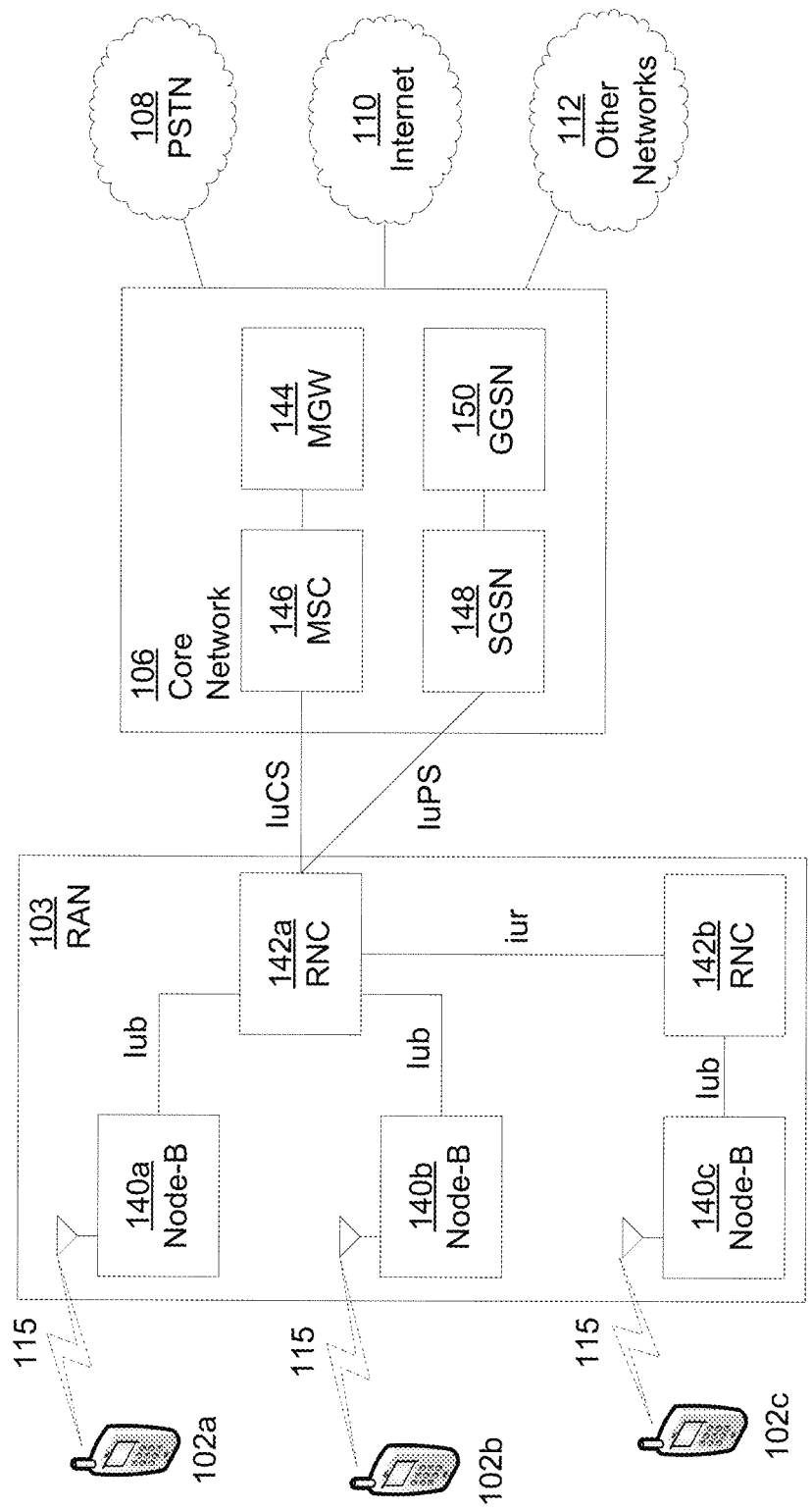
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
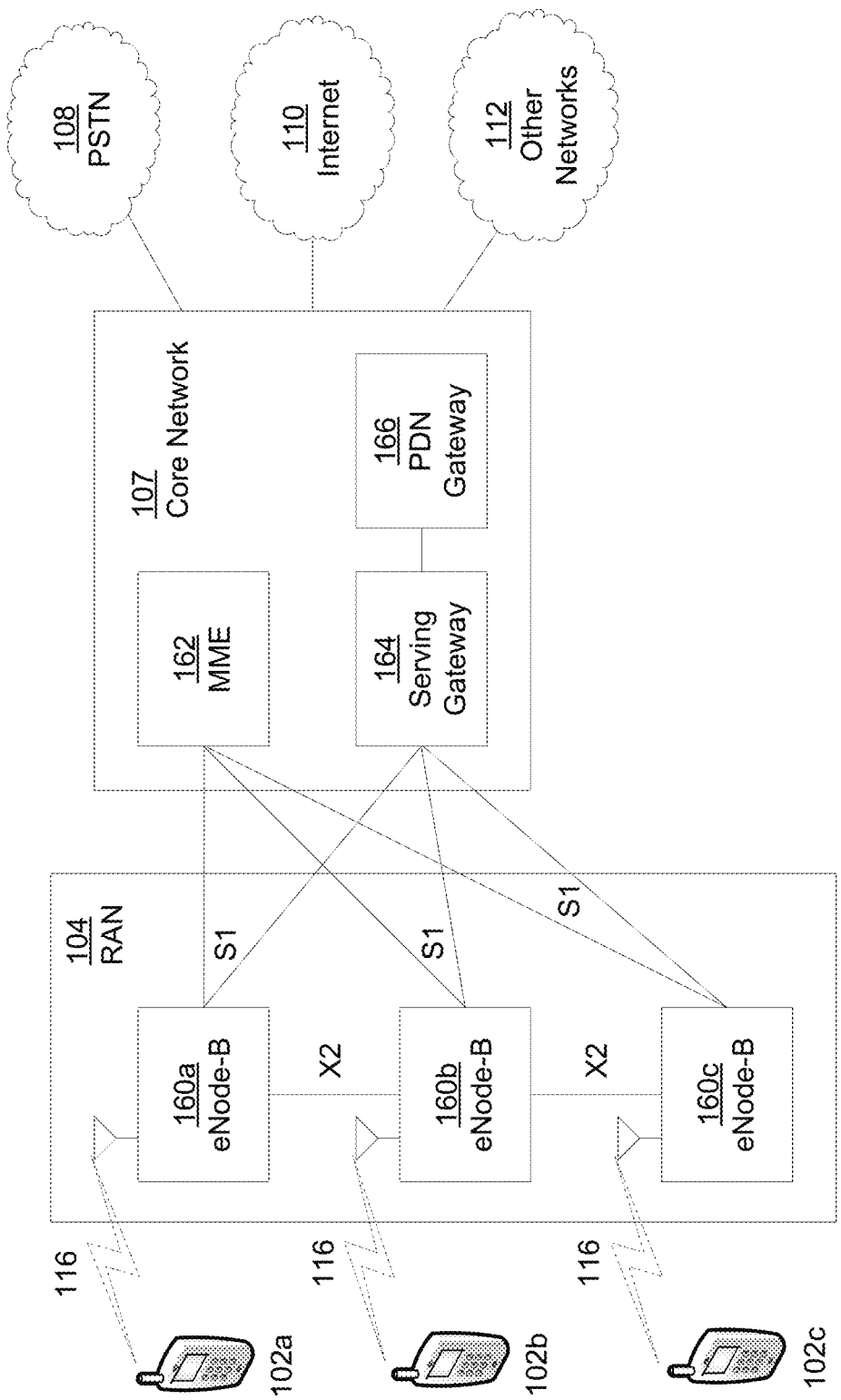
FIG. 1D is a system diagram of an another example radio access network and an another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
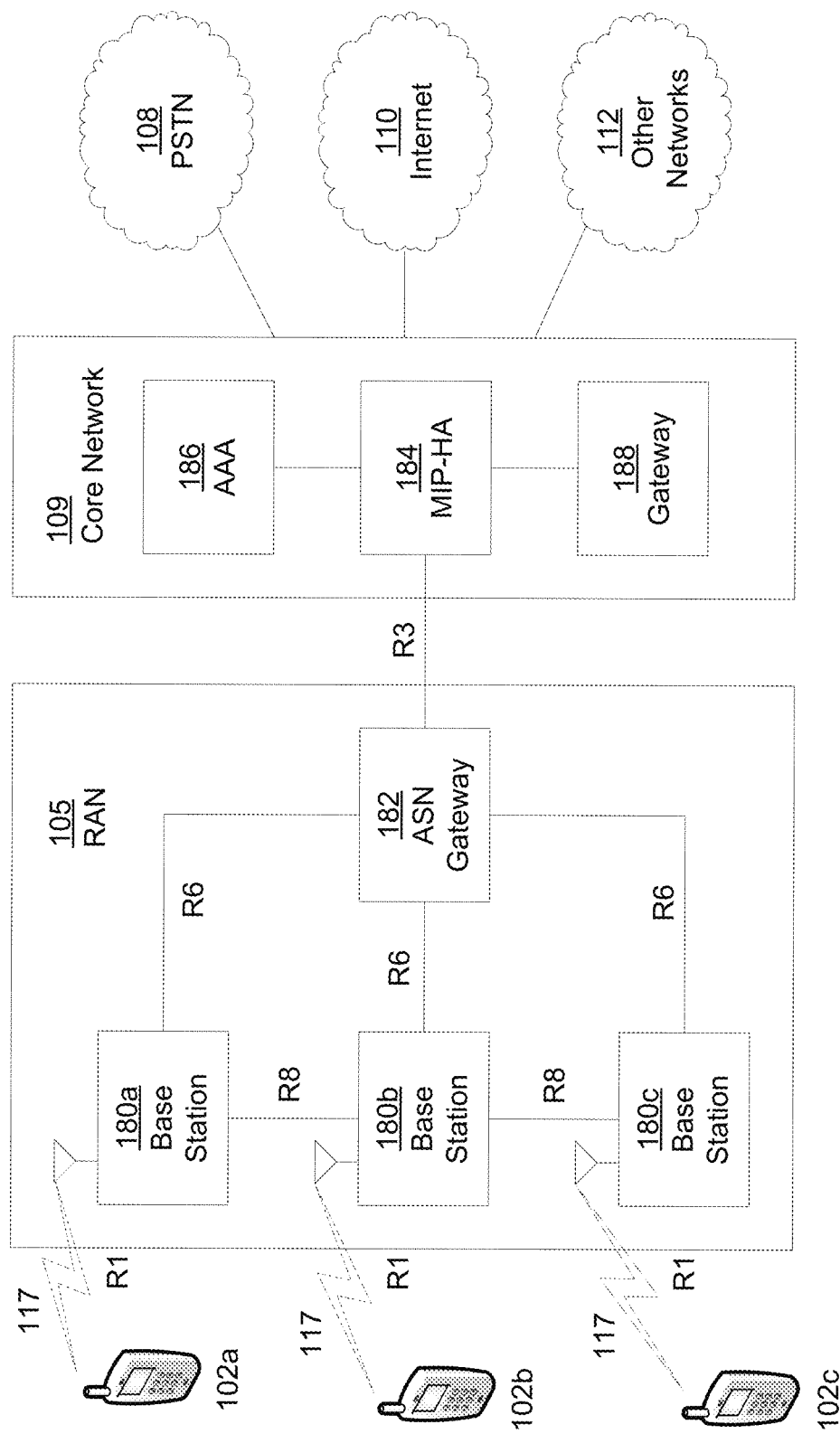
FIG. 1E is a system diagram of an another example radio access network and an another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed to propagate announcement of a resource across one or more networks. A first entity, which may be a hosting service capability layer (SCL), may receive a request from an issuer to announce a resource. For example, the issuer may send the request to the first entity in order to announce resources to other SCL's. The first entity may create a representation of the resource. The representation may be referred to as an announced resource. The announced resource may include one or more of the following: a search string, an attribute, or a URI of the resource upon which the representation is based. The first entity may send an announce resource request to a second entity (e.g., an announced-to SCL), which may be registered with the first entity. The announce resource request may be sent over an mId interface. The first entity may receive a first response from the second entity over the mId interface indicating that the second entity created the resource.

The first entity may determine that the second entity is an entity to announce to based on accessibility of the resource. The first entity may post the resource to the second entity under a known Uniform Resource Identifier (URI). The first entity may send a second response to the issuer indicating that the second entity created the resource (e.g., after receiving the first response). The first entity may determine a plurality of SCL's to announce to. The first entity may be connected to many SCL's and may choose the plurality as a subset of the many SCL's based on security restraints, access control, etc.

Figure 2:
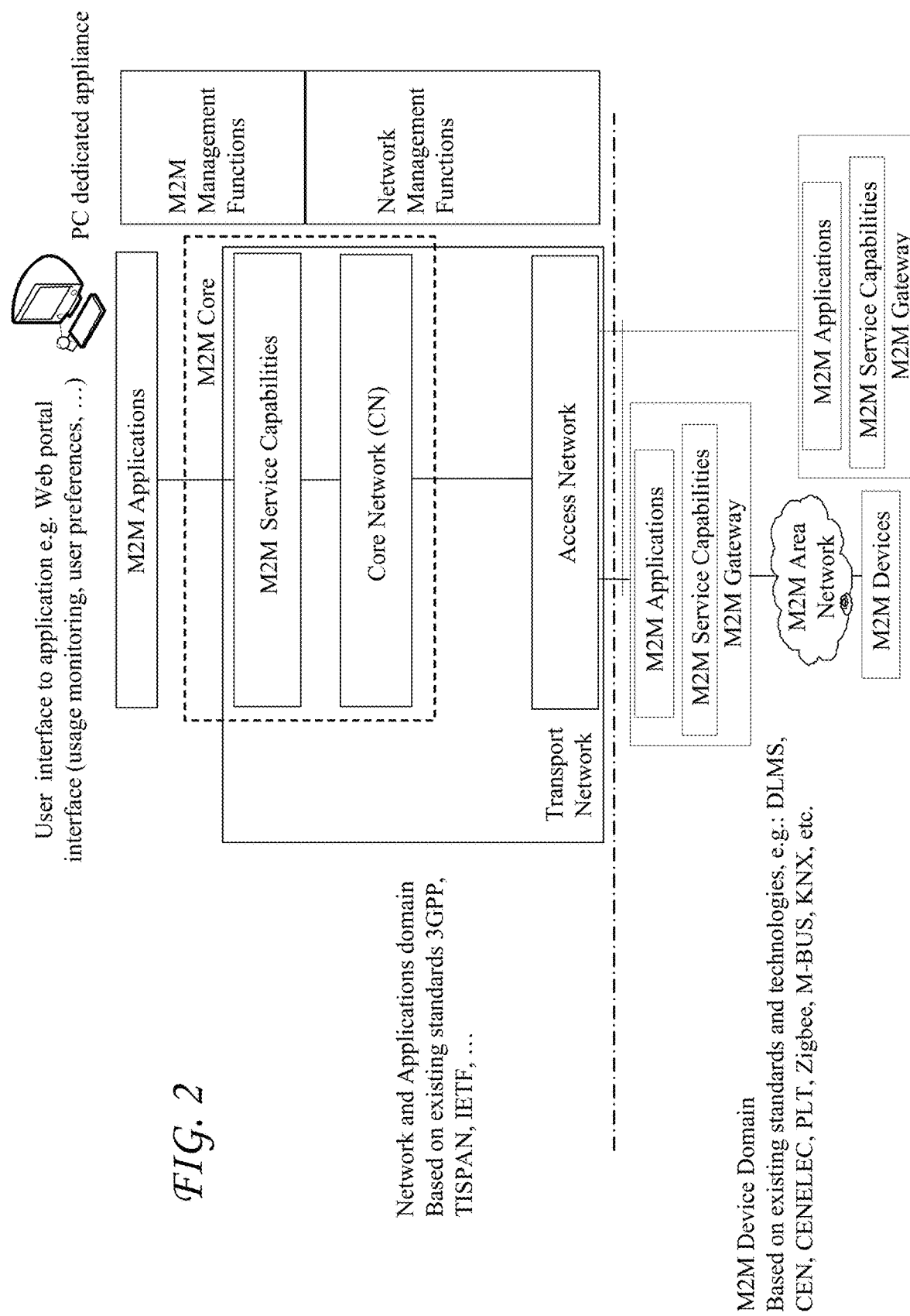
FIG. 2 illustrates exemplary end-to-end M2M system architecture.

FIG. 2 illustrates an exemplary end-to-end M2M system architecture. The M2M system architecture may include an M2M device domain, as well as a network and applications domain.

The M2M device domain may include one or more of the following: an M2M Device, an M2M Area Network, or an M2M Gateway. An M2M Device may be a device that runs M2M Application(s) using M2M Service Capabilities (SCs) and network domain functions. M2M Devices may connect to the M2M Core directly or indirectly via one or multiple (sequential or parallel) gateways. An M2M Area Network may provide connectivity between M2M Devices and M2M Gateways. Examples of M2M Area Networks may include Personal Area Network technologies, e.g., IEEE 802.15.x, Zigbee, Bluetooth, IETF ROLL, ISA100.11a, and the like. An M2M Gateway may use M2M Service Capabilities to ensure M2M Devices interworking and interconnection to the network and application domain. The M2M Gateway may also run M2M applications.

The network and application domain may include one or more of the following: an Access Network, a Transport Network, or an M2M Core. An Access Network may allow the M2M Device Domain to communicate with the Core Network. Examples of Access Networks may include one or more of the following: xDSL, HFC, PLC, satellite, GERAN, UTRAN, eUTRAN, W-LAN, or WiMAX. A Transport Network may allow transport of data within the network and application domain. An M2M Core may be composed of a Core Network and Service Capabilities. The Core Network may provide one or more of the following: IP connectivity and potentially other connectivity means; service and network control functions; interconnection (e.g., with other networks); or roaming. Examples of Core Networks may include one or more of the following: 3GPP CNs, ETSI TISPAN CN, or 3GPP2 CN. Examples of M2M Service Capabilities (SCs) may be include one or more of the following: a Network Application Enablement (NAE) capability; a Network Generic Communication (NGC) capability; a Network Reachability, Addressing and Repository (NRAR) capability; a Network Communication Selection (NCS) capability; a Network Remote Entity Management (NREM) capability; a Network Security (NSEC) capability; a Network History and Data Retention (NHDR) capability; a Network Transaction Management (NTM) capability; a Network Interworking Proxy (NIP) capability; or, aNetwork Telcom Operator Exposure (NTOE) capability.

Figure 3:
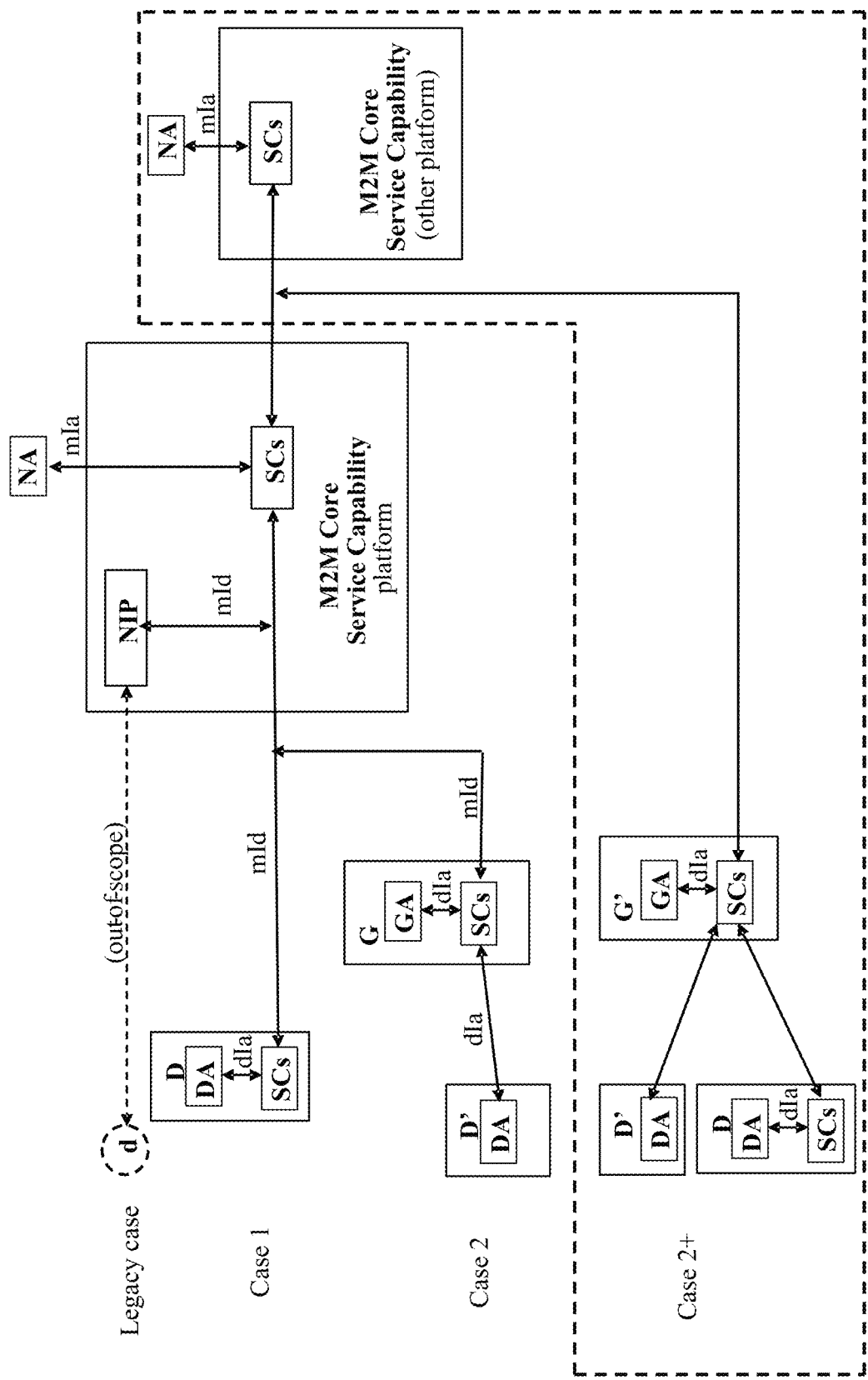
FIG. 3 illustrates an exemplary service capabilities functional architecture framework.

Systems, methods, and instrumentalities are disclosed relating to M2M interface procedures for announce and de-announce of resources. Exemplary resources may include, but are not limited to, smart meters, including data collected from smart meters, and medical equipment (e.g., blood pressure monitoring equipment). FIG. 3 illustrates an exemplary block diagram of a service capabilities functional architecture framework that may be utilized in accordance with embodiments disclosed herein. Referring to FIG. 3, gateway (G) may be an ETSI M2M device to manage M2M area networks of ETSI M2M devices. The gateway may communicate with an ETSI M2M core network. Device (D) may be an ETSI M2M device that may communicate to an ETSI M2M core network or to an ETSI M2M gateway. Device' (D') may be an ETSI M2M device that does not implement ETSI M2M Service Capabilities. Device' (D') may interact indirectly with the M2M Core via the use of Service Capabilities in the M2M Gateway (G). Gateway' (G') may be an ETSI M2M Gateway that provides connectivity to both D and D' devices. There may be a non-ETSI M2M compliant device (d') belonging to an area network managed by an ETSI M2M compliant Device or Gateway entities. Device d may not be able to access M2M service capabilities directly.

Announced resources may be resources that are used by the M2M service capability later (SCL) in which these announced resources are hosted to keep track of remote (announcing) resources (e.g., resources living in a remote SCL) that may be discoverable in this SCL. Announced resources may comprise a link to the announcing resource. An announced resource's visibility may be limited to when it is accessed via its full URL. In other cases, e.g., during discovery and during listing the parent collection resource, a direct reference to the remote/announcing resource may be returned. There may be a containment relation between the collection resource and the announced resource, e.g., when the collection is removed, the contained resources may be removed as well, whether they represent local resources or announced resources. In such case, the announcing resource (the resource to which the announced resource refers) may not be removed. When the announcing resource is removed, it may be the responsibility of the remote SCL to remove the announced resource. If this is not done, there may be a certain time that a discovery can give a reference to a non-existing remote resource.

There may be different kinds of announced resources, e.g., since the announced resources may share the same child collection resources as the resource they represent. The latter allows for explicit creation of child resources (e.g., groups, access rights, containers, etc.) as descendants of the announced resource. Since this may be a normal containment relation, such child resource may be removed when the announced resource is removed (e.g., when the remote resource is de-announced).

An entity may be an SCL or an application. An issuer may be an actor performing a request, e.g., relating to an announced resource. An issuer may be an application or a SCL. An announced resource, which may be referred to as a mirrored resource, may have content that refers to a resource hosted by another SCL (e.g., a master/original resource). The announced resource is an actual resource that may comprise a limited set of attributes, e.g., search strings, the link to the original resource (e.g., URI), etc. A purpose of the announced resource may be to facilitate a discovery of the original resource, so that the issuer of the discovery does not have to contact many SCLs in order to find the resource.

A Local (e.g., Registration) SCL may be an SCL where an application/SCL registers to. The local SCL may be an SCL that receives the request from the original issuer of the request (e.g., an application or an SCL). If an NA is the original issuer, the Local SCL may be the N-SCL. Further, if a GA is the original issuer, the Local SCL may be the G-SCL. If a DA in a D device is the original issuer, the Local SCL may be the D-SCL. If a DA in a D' device is the original issuer, the Local SCL may be the G-SCL. If a D-SCL in a D device is the original issuer, the Local SCL may be the G-SCL or N-SCL. If a G-SCL is the original issuer, the Local SCL may be the N-SCL.

The hosting SCL may be the SCL where the addressed (e.g., actual) resource resides. An announced-to SCL may be an SCL that comprises the announced resource. A resource may be announced to multiple SCLs. In the context of resource discovery, a "link" may be an "URI" or a "collection of attributed resource references."

Resources may be stored at different SCLs. To reduce duplication of resources, as well as resource discovery time, an actual resource may be stored at one SCL and a representation of the actual resource or copies stored at other SCLs. The announce procedure may be used for an SCL to propagate its resource representations or resources to other SCLs. The de-announce procedure may be used for an SCL to remove a previously propagated resource from other SCLs.

Figure 4:
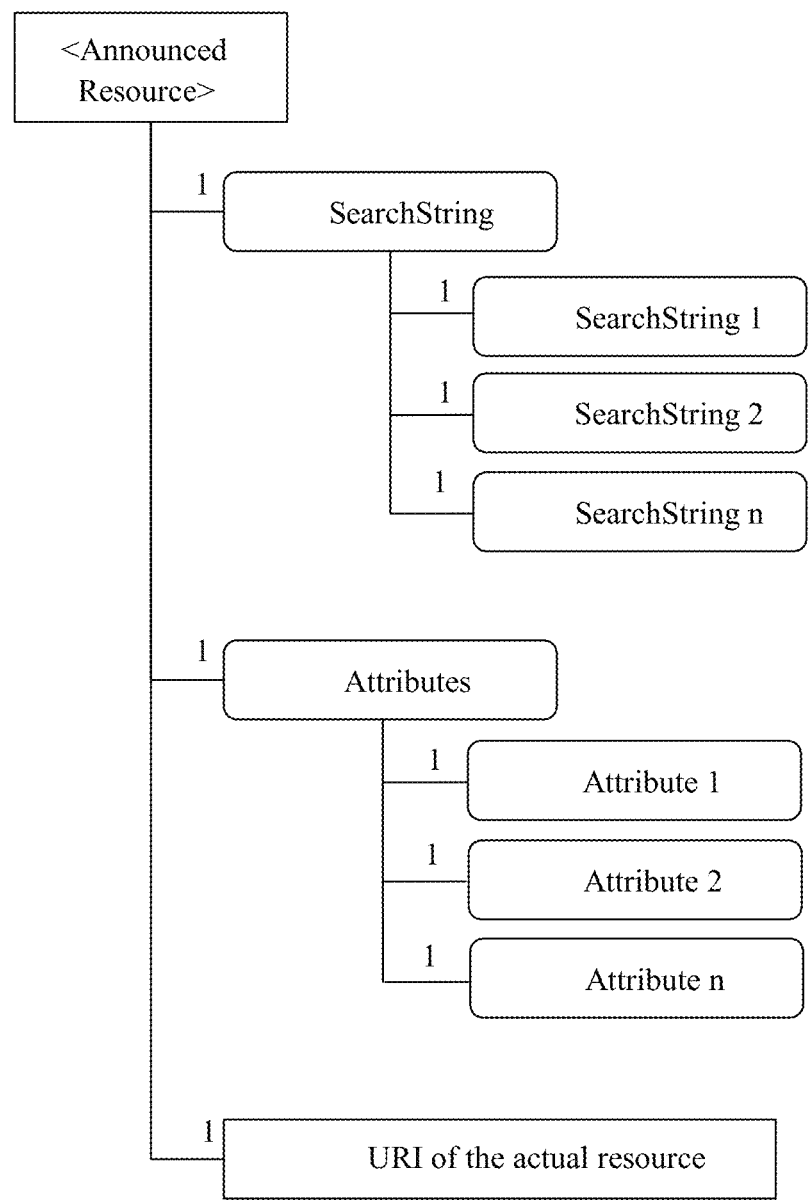
FIG. 4 illustrates an exemplary announced resource structure.

FIG. 4 illustrates an exemplary announced resource structure. The announced resource may be a representation of an actual resource. A resource type identifier may be used to identify that a resource is an announced resource.

An announced resource may comprise one or multiple SearchStrings. A SearchString may be used to match a search string in an access request. A SearchString may be a human-readable name of a resource, texts from the resource, etc.

As shown in the example of FIG. 4, an announced resource may comprise one or multiple attributes. Examples of attributes may include one or more of the following: accessibility (READ/WRITE), lifetime (e.g., a value that indicate how long the announced resource should be valid), size of the resource, or media type. An announced resource may be announced (e.g., by a hosting SCL), for example, as "broadcast" "muiticast" or "unicast." Broadcast may indicate that the resource may be announced to any SCL or application. Multicast may indicate that resource announcement may be limited to a group of allowed SCLs and/or applications. Unicast may indicate that the resource announcement may be limited to a specific SCL or application. The original resource AccessRights may be inherited from the original resource.

Some attributes may be searchable so they may be used as SearchString. When referring to a resource residing on another SCL, the content of the Announced Resource may comprise the URI of the resource.

An entity (e.g., an issuer) may announce a resource(s) to other entities, such as SCLs. This may include a first/initial announcement and subsequent updates. An issuer may be an application or an SCL that may request to announce its available resources to other SCLs. The trigger of the announce procedure may include one or more of the following: initialization of a hosting SCL, creation of a new resource(s), update of a resource(s), hosting SCL found a new SCL, etc. The issuer may announce resources periodically. When an application creates or updates a resource, the application may indicate if the resource can be announced based on how the application wants the resource to be visible. The application may indicate how the representation of the resources should be configured.

Figure 5:
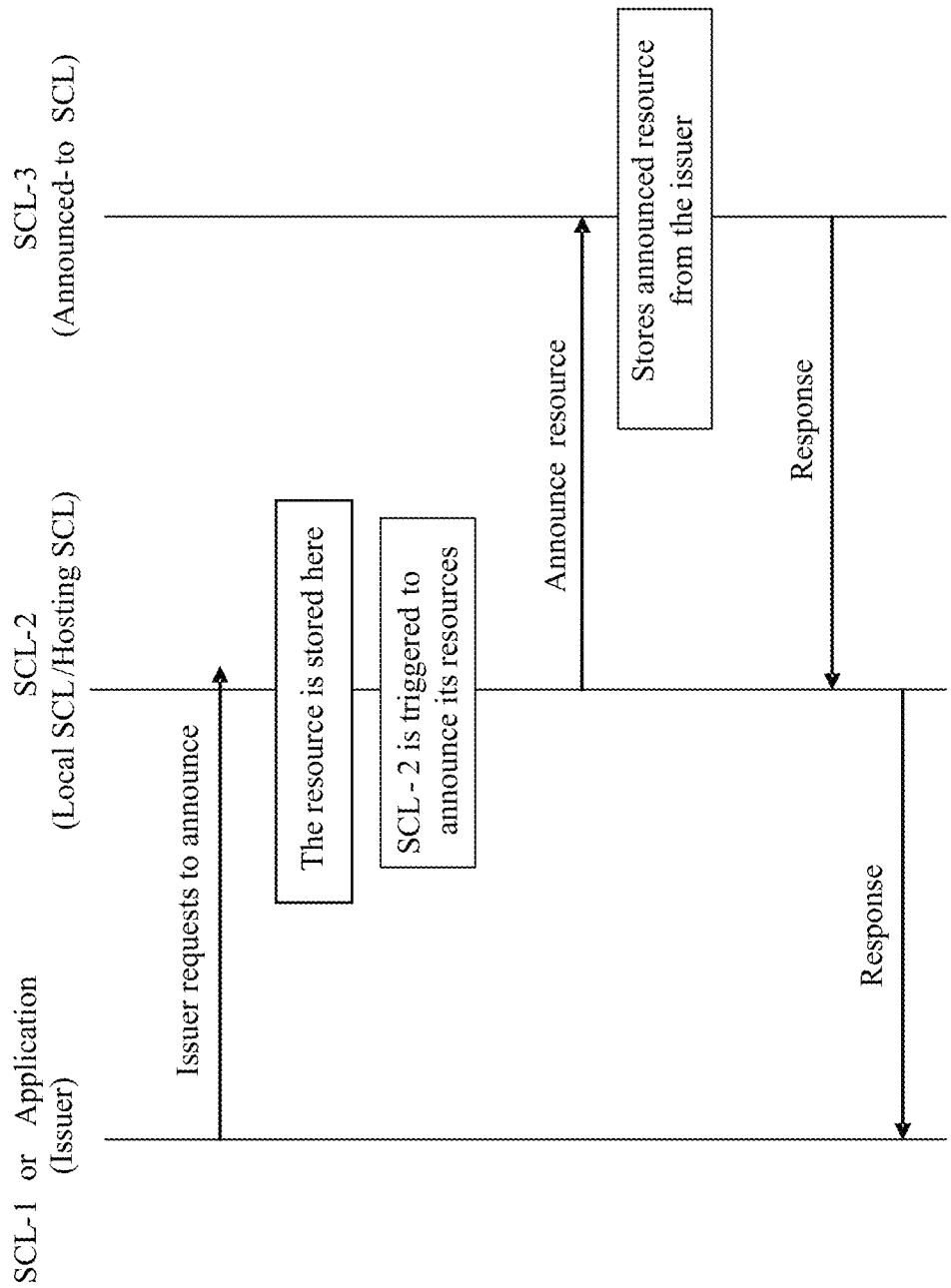
FIG. 5 illustrates an exemplary call flow to announce resources.

Based on the request from the issuer, the hosting SCL may announce the resource, e.g., to other SCLs, in the form of an announced resource. The issuer of the announce procedure may be the hosting SCL itself. The Hosting SCL may form a representation of the resource (e.g., create an announced resource as illustrated in FIG. 5) and send an "announce resource" request to the targeted SCL(s). The Hosting-SCL may decide which target SCL(s) it should announce to according to the resource's accessibility. Unless an announced resource can be broadcast, the announced-to SCL may need to have been registered with the Hosting SCL. Due to reasons such as security and access control, the hosting-SCL may be limited to which SCL(s) it may announce to (e.g., it may not announce to all SCLs that it is connected to). The Announced-to SCL may create the announced resource locally.

An SCL may post the announced resources to another SCL under a known URI (e.g., as part of the announce procedure). The issuer (e.g., application or SCL) may perform a GET to /.known/to an SCL to retrieve available announced resources. For example, CoAP may define a known/core URI for resource discovery.

The announced-to SCL may propagate the announced resource to other SCLs that it is connected to. The Announced-to SCL may take parts of the attributes and propagate a new simplified Announced Resource to other SCLs.

FIG. 5 illustrates an exemplary flow diagram to announce resources. Referring to FIG. 5, the SCL-1 or application, (e.g., issuer), may communicate a request to announce to SCL-2 (e.g., local SCL/hosting SCL), where the resource may be stored (e.g., created). The storage/creation by SCL-2 may comprise storing/creating a representation of the actual resource; the representation may be referred to as an announced resource (e.g., see FIG. 4). In response to the communication, SCL-2 may be triggered to announce its resource (e.g., the announced resource), which may include sending an announce resource communication to SCL-3 (e.g., announced-to SCL). SCL-3 may store (e.g., create) the announced resource. Responses may be communicated as shown in FIG. 5.

An announced resource may be accessed. For example, an issuer may be an entity that wants to access the announced resource. The issuer may compose a request message to its local (registration) SCL, asking for a resource. The request may comprise one or more SearchStrings. The Local SCL may or may not be the announced-to SCL; it may or may not have the information for the requested resource. If the Local SCL is not the announced-to SCL, it may propagate the request to other SCLs that it is connected to until it reaches the announced-to SCL. According to an embodiment, to reduce extra load to the network and limit the hops of such request, the access resource request may indicate a maximum number of SCLs or a limit number of hops may be pre-configured at different entities.

The announced-to SCL may check the access rights of the issuer, and if it is not allowed to access the announced resource, the announced-to SCL may return a status code, for example, indicating access denied. If the issuer is allowed to access the announced resource, the announced-to SCL may provide access, e.g., using one of the following examples.

In a synchronous way, the Announced-to SCL may forward the access request to the Hosting SCL. One use case for the synchronous way is that the URI of an actual resource may be invisible to the issuer, so the announced-to SCL may not return the URI back to the issuer. Instead, the announced-to SCL may need to perform the retrieve action on behalf of the issuer and return the actual content of the resource to the issuer. In an asynchronous way, the Announced-to SCL may return the URI of the announced resource to the issuer and the issuer may query the master/ original resource from the Hosting SCL.

If the Hosting SCL receives a request to access the actual resource, the Hosting SCL may check the access right of the issuers, and if permitted, the Hosting SCL may send a response with success status. If not permitted, it may return access denied (e.g., via a status code).

Figure 6:
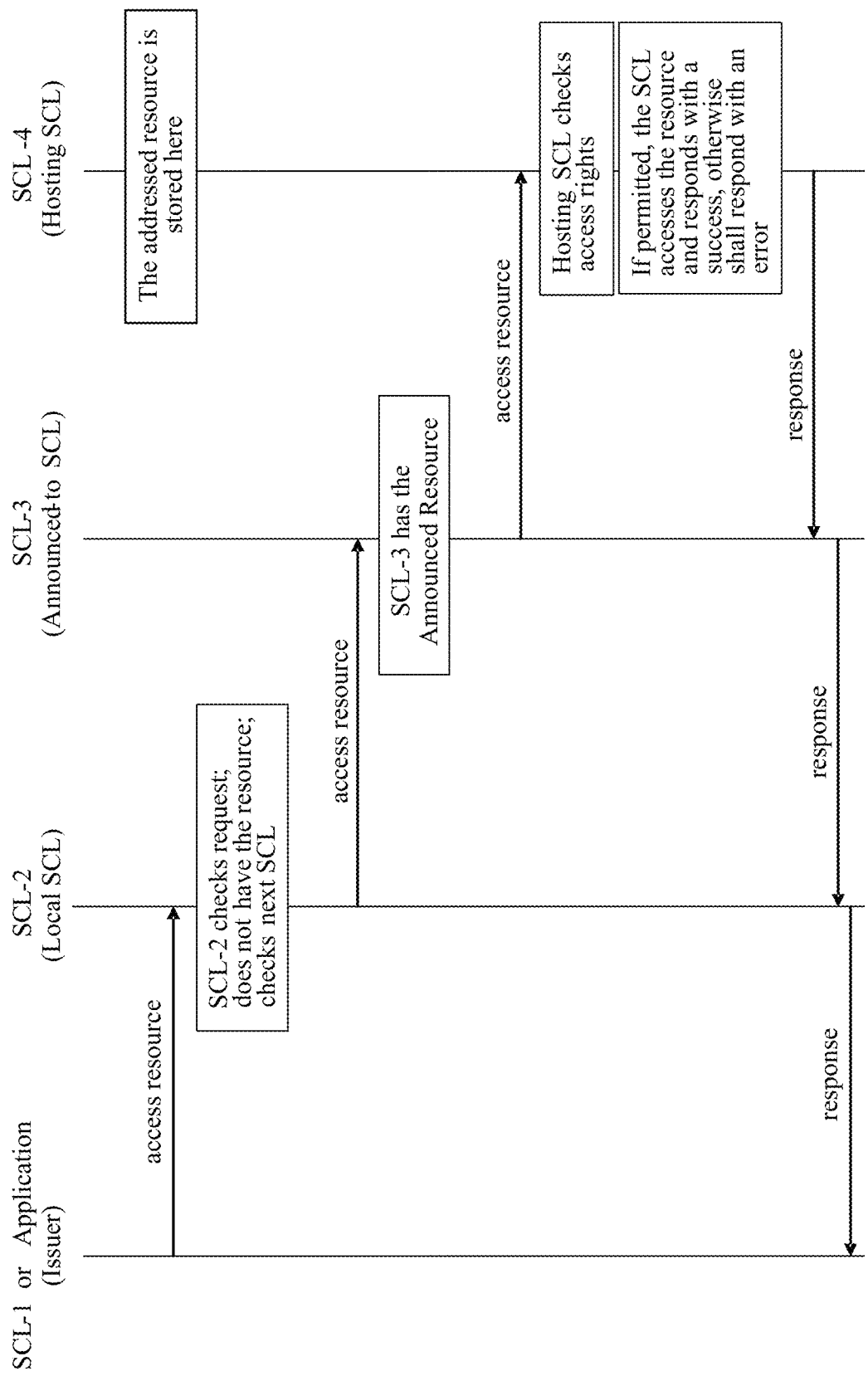
FIG. 6 illustrates an exemplary call flow to access announced resources in a synchronous manner.

FIG. 6 illustrates an exemplary flow diagram to access announced resources in a synchronous manner. Referring to FIG. 6, the SCL-1 or application, (e.g., issuer), may send a communication to access a resource to the SCL-2 (e.g., local SCL). In response, the SCL-2 may check the request and may check a next SCL if it does not have the resource. In such a case, SCL-2 may send a communication to access the resource to the SCL-3 (e.g., announced-to SCL). If SCL-3 has the announced resource, it may send an access resource communication to the SCL-4 (e.g., hosting SCL). The hosting SCL may check access rights, and if permitted, it may accesses the resource and respond with a success indication. Otherwise, the hosting SCL may respond with an error. Responses may be communicated as shown.

Figure 7:
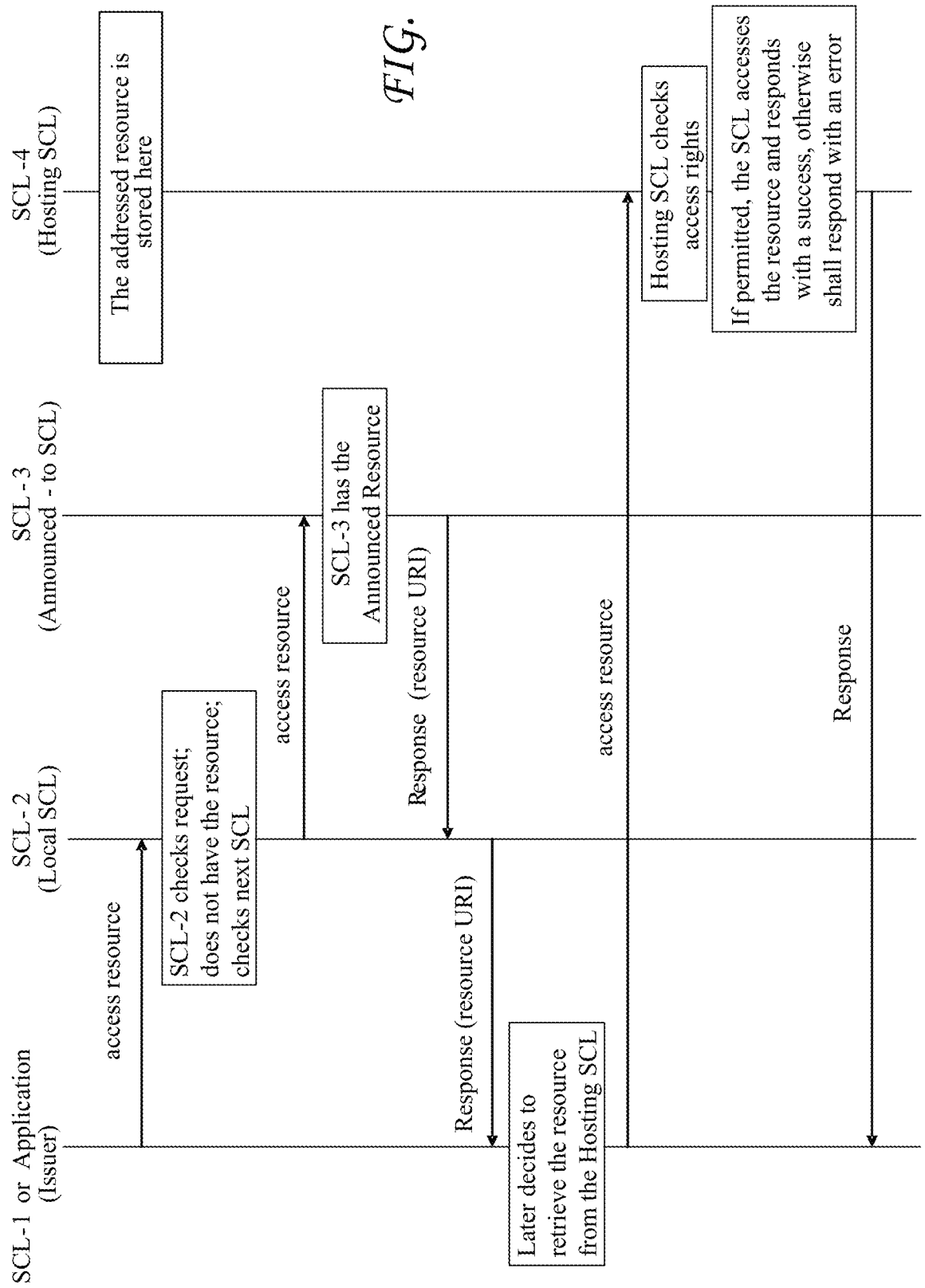
FIG. 7 illustrates an exemplary call flow to access announced resources in an asynchronous manner.

FIG. 7 illustrates an exemplary flow diagram to access announced resources in a asynchronous manner. Referring to FIG. 7, the SCL-1 or application, (e.g., issuer), may send a communication to access a resource to SCL-2 (e.g., local SCL). In response, SCL-2 may check the request and may check a next SCL if it does not have the resource. In this case, SCL-2 may send a communication to access the resource to SCL-3 (e.g., announced-to SCL). In response to the communication and a determination that SCL-3 has the announced resource, SCL-3 may respond with the resource URI, wherein response messages indicating the resource URI may be communicated to SCL-2 and SCL-1. If SCL-1 decides to retrieve the resource from the hosting SCL, it may use the resource URI to send an access resource message to SCL-4 (e.g., hosting SCL). In response, the hosting SCL may check access rights, and if permitted, it may access the resource and respond with a success indication. Otherwise, the hosting SCL may respond with an error. A response can be communicated to SCL-1 as shown.

An announced resource may be de-announced. De-announce may be implicit, e.g., if the announced resource has an expiration time. The issuer may request to de-announce previously announced resources. The trigger for de-announce may be, for example, either that a resource does not exist anymore in the Hosting SCL or because the issuer of the announce procedure (e.g., Hosting SCL or an application) does not want to announce its resource(s) any longer.

Due to triggers from the issuer, the hosting SCL may decide to de-announce a previously announced resource. The hosting SCL may be the issuer itself. The hosting SCL may send a "de-announce" request message to the announced-to SCL to "de-announce" one or multiple resources. In the de-announce request, the hosting SCL may indicate one or multiple announced resources. Each announced resource may be indicated by an identifier. Upon receiving a de-announce message, the announced-to SCL may delete the announced resource, and may send a response with the status of the deletion to the hosting SCL. If the announced-to SCL propagated the announced resource to other SCLs, it may also propagate the de-announce request to de-announce the resources.

Figure 8:
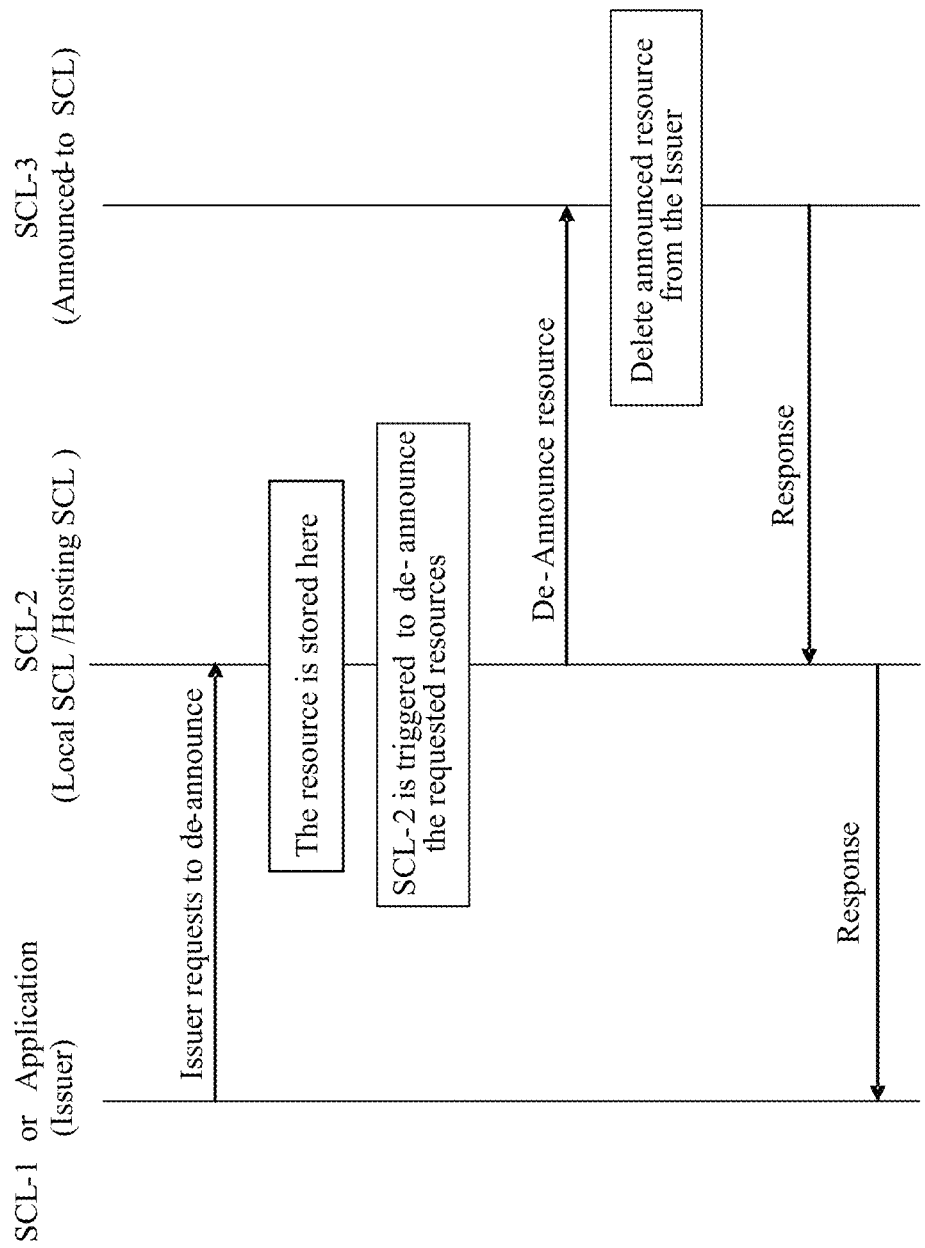
FIG. 8 illustrates an exemplary call flow to de-announce resources.

In accordance with an embodiment, FIG. 8 illustrates an exemplary flow diagram to de-announce resources. Referring to FIG. 8, the SCL-1 or application, (e.g., issuer), may send a communication to de-announce to SCL-2 (e.g., local SCL). If SLC-2 has the resource, in response SCL-2 may trigger to de-announce the requested resource and send a de-announce communication to SCL-3 (e.g., announced-to SCL). In response, SCL-3 may delete the announced resource from the issuer. A response may be communicated to SCL-1 as shown.

A structure and/or rules may be associated with announce/de-announce. Resources with a searchString attribute may have the ability to be announced. For each resource that may be announced, an attribute may define whether the resource should be announced or not. If it can be announced, it may be associated with the rules about how to announce (e.g., lifetime, refreshment, etc.).

Each resource that is announced may require information related to how the SCL hosting this resource (e.g., Hosting SCL) is to manage the announcement, e.g., announce rules. This information may be included in a list of attribute(s) related to the resource, a data structure related to the resource that comprises the list of attributes, in a sub-resource of the resource, in some combination of these, etc.

Announcement information may be included in a list attributes tied to the application resource. For example, Table 1 below shows example attributes of resources. The symbol "*" indicates announcement attributes.

Below is an example of announcement information related to an "application" resource. A similar format may apply to other resource types: "group" resources, "Container" resources, "accessRights" resources, etc.

TABLE 1

| Attributes of Resources <application> | | | |
|---|---|---|---|
| AttributeName | Mandatory/Optional | Type | Description |
| applicationStatus | M | RW | May default to ONLINE if created via the API. |
| expirationTime | M | RW | This may represent the expiration time of the resource if the applicationStatus is NOT_REGISTERED, in other cases it may represent the expiration time of the registration. If the SCL does not refresh its registration before that time, the applicationStatus may return to NOT_REGISTERED or, depending on server policy, the resource is deleted. |
| accessRightID | O | RW | |
| searchStrings | M | RW | |
| creationTime | M | RO | |
| lastModifiedTime | M | RO | |
| memberOf | M | RO | |
| announcedTo | O | RO | This may define where the current resource has been announced to. |

TABLE 1-continued

Attributes of Resources <application>

| AttributeName | Mandatory/Optional | Type | Description |
|---|---|---|---|
| * announcibility | M | RW | Used to activate/deactivate announcement. A value "Yes" (or True) means it may be announced; "No" (or False) means it may not be announced. |
| * announceTo | M | RW | An application which created the resource or the hosting SCL may provide the destination SCLs where the resource to be announced to may be found. The destinations may be IDs of specific SCLs (e.g. SCL1, SCL2), or may be domain types (e.g. a smartMeter type, or any nodes belong to company X, etc.). The attribute may be set to "ALL" or "BEST EFFORT". If set to "ALL", the SCL hosting this resource may announce to the SCLs to which it has the rights. If set to "BEST EFFORT", the SCL hosting this resource may decide who to announce to. This attribute may also be defined as OPTIONAL. If so, a default behaviour may be assumed if the attribute is not included when the resource is created or updated (for example, announce to "ALL" or announce to "BEST EFFORT"). |
| * anncLifeTime | M | RW | May define the expiration time of an announced-to resource |
| * refreshInterval | O | RW | If the announced-to resource has an anncLifeTime which is not "valid till deannounced", a "refresh" interval may be defined. Retry to announce again When searchString in the announced -to resource The SCL hosting this resource may periodically refresh the announced resource. |
| * confirmable | M | RW | May define if a confirmation message is required for the announcement. The attribute may be defined as OPTIONAL. If the attribute is not included when the resource is created or updated, a default behaviour may be assumed (for example, always confirm or never confirm). |
| * propagation | O | RW | Optional flag may denote whether the announcement can be propagated by the announced-to SCL to additional SCLs. |
| * propagationCount | M | RW | Mandatory if propagation is allowed - otherwise may not be needed. The number of hops the announcement can be propagated. Each time an SCL propagates a resource, it creates an announced resource with a decremented (by one) propagationCount. |
| * propogatedTo | M | RO | Mandatory if propagation is allowed - otherwise may not be needed. List of SCLs that have propagated the announcement. |

In the case that the issuer is an application, attributes listed as mandatory above may be optional, and, a final decision may be left to the Hosting SCL. The Hosting SCL may execute announce rules defined by the application that created the original resource. If the rules are not defined by the application (e.g., an application may not care about how its resources are to be announced), the Hosting SCL may complete the rules defined as mandatory fields in the above table.

The announcement information may be included as a sub-resource to the application resource, e.g., as shown below. The symbol "*" indicates announcement attributes.

TABLE 2

Resources <application>

| subResource | Mandatory/Optional | Multiplicity | Description |
|---|---|---|---|
| containers | M | 1 | May include local containers created by the parent application. |
| groups | M | 1 | May include local groups created by the parent application. |
| accessRights | M | 1 | May include local accessRights created by the parent application. |
| accessStatus | M | 1 | |
| subscriptions | M | 1 | |
| * announceRules | O | 1 | This sub-resource may be used as a flag to indicate if the parent resource is to be announced. If present, the announcement may follow the rules specified by the announceRules sub-resource attributes. |

TABLE 3

Attributes Sub-Resource announceRules of Resources <application>

| AttributeName | Mandatory/Optional | Type | Description |
|---|---|---|---|
| * announcibility | M | RW | May be used to activate/deactivate announcement. A value "Yes" (or True) means it can be announced; "No" (or False) means it cannot be announced. |
| * announceTo | M | RW | An application that created the resource or the hosting SCL provide the destination SCLs where the resource to be announced to may be found. The destinations can be IDs of specific SCLs (e.g. SCL1, SCL2), or can be domain types (e.g. any smartMeter type, or any nodes belong to company X).<br>The attribute may be set to "ALL" or "BEST EFFORT". If set to "ALL", the SCL hosting this resource may announce to the SCLs to which it has the rights. If set to "BEST EFFORT", the SCL hosting this resource may decide who to announce to.<br>This attribute may also be defined as OPTIONAL. If so, a default behaviour may be assumed if the attribute is not included when the resource is created or updated (for example, announce to "ALL" or announce to "BEST EFFORT") |
| * anncLifeTime | M | RW | May defines the expiration time of an announced-to resource |
| * refreshInterval | O | RW | If the announced-to resource has an anncLifeTime which is not "valid till deannounced", a "refresh" interval may be defined.<br>Retry to announce again<br>When searchString in the announced -to resource<br>The SCL hosting this resource may periodically refresh the announced resource. |
| * confirmable | M | RW | May define if a confirmation message is required for the announcement. Alternatively, the attribute may be defined as OPTIONAL. If the attribute is not included when the resource is created or updated, a default behaviour may be assumed (for instance always confirm or never confirm) |

TABLE 3-continued

Attributes Sub-Resource announceRules of Resources <application>

| AttributeName | Mandatory/Optional | Type | Description |
|---|---|---|---|
| * propagation | O | RW | Optional flag may denote whether the announcement can be propagated by the announced-to SCL to additional SCLs. |
| * propagationCount | M | RW | Mandatory if propagation is allowed - otherwise may not be needed. The number of hops the announcement can be propagated. Each time an SCL propagates a resource, it creates an announced resource with a decremented (by one) propagationCount. |
| * propogatedTo | M | RO | Mandatory if propagation is allowed - otherwise may not be needed. List of SCLs that have propagated the announcement. |

Figure 9:
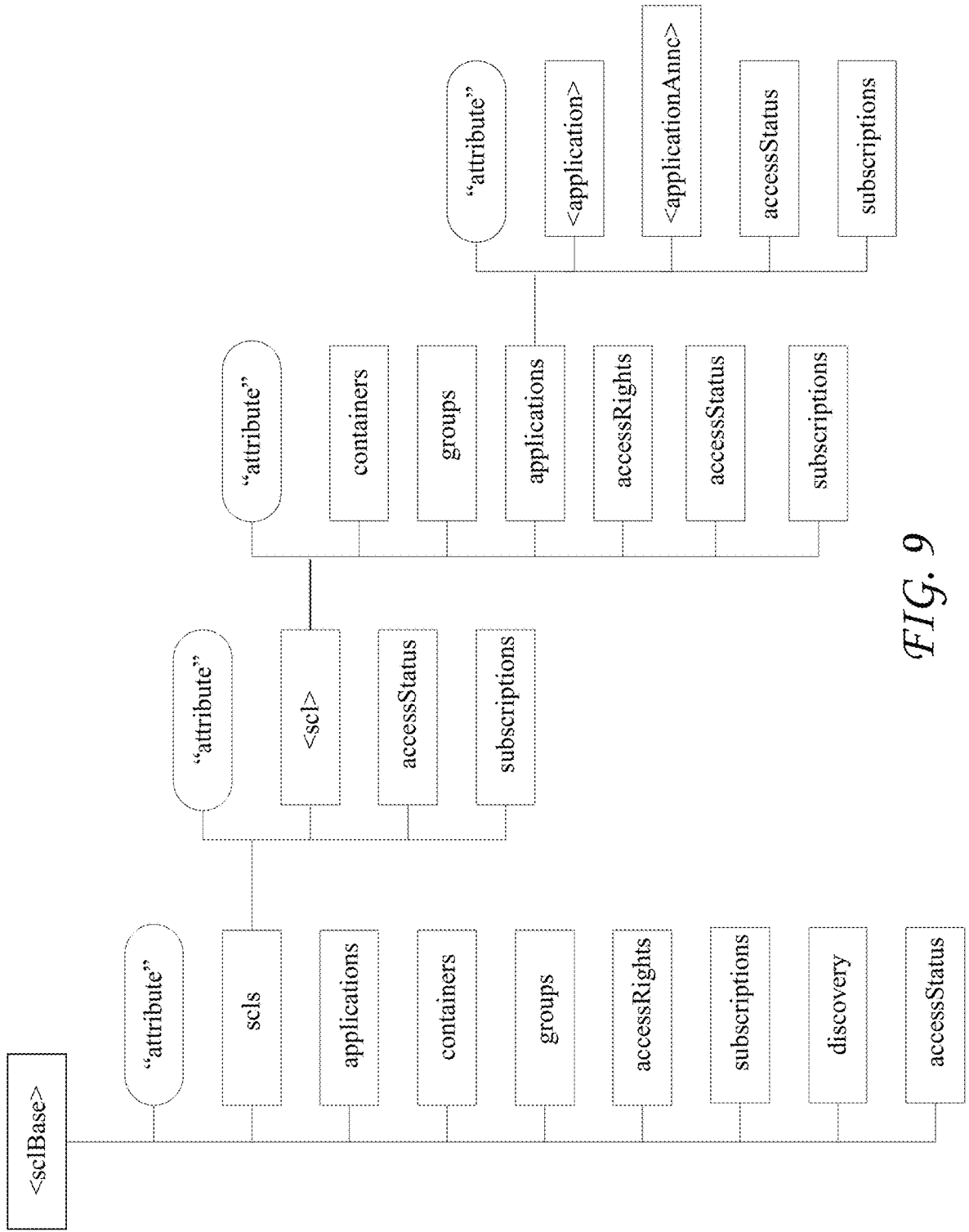
FIG. 9 illustrates an exemplary resource structure to store an announced application resource.

A structure may be provided for storing announced-to resources. For example, FIG. 9 illustrates an exemplary resource structure to store an announced application resource located at: <sclBase>/scls/scl/applications/applicationAnnc.

Figure 10:
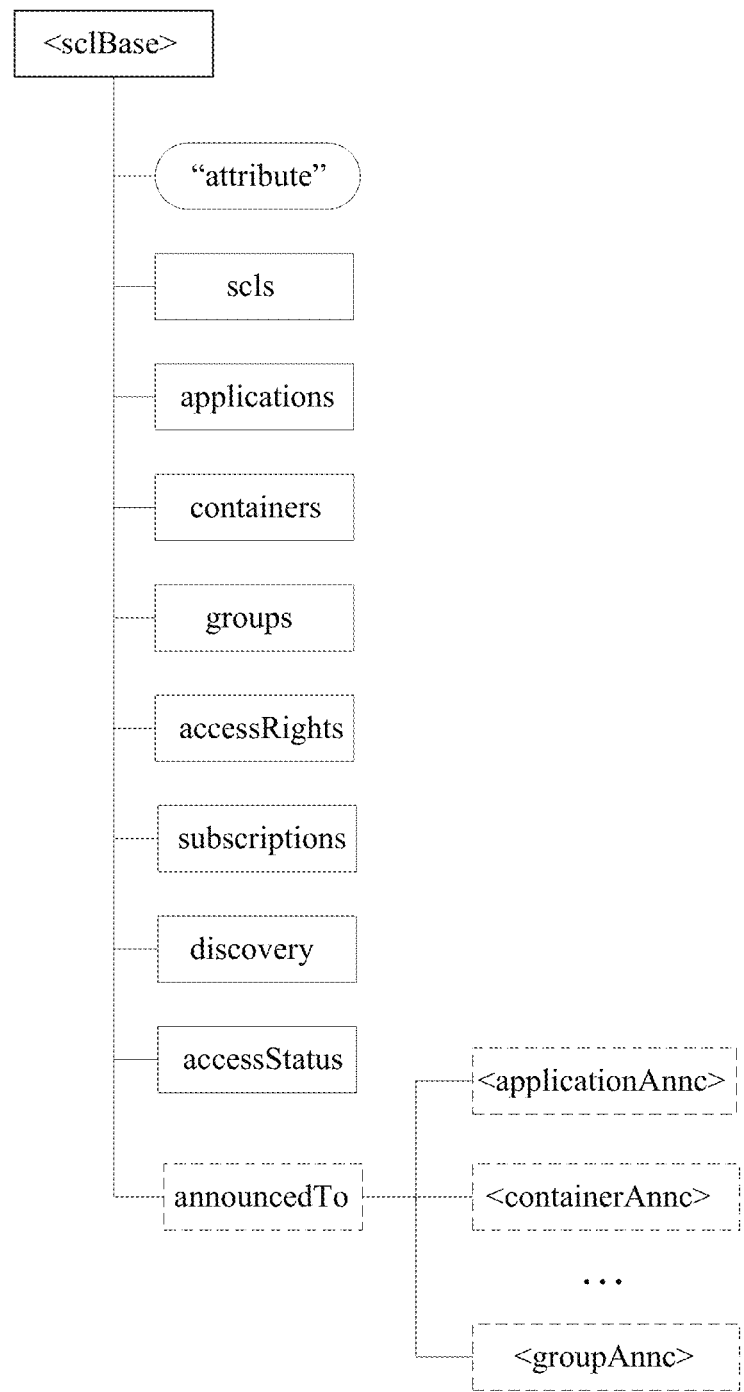
FIG. 10 illustrates an exemplary resource structure to store announced-to resources.

Announced-to resources may be stored under the sclBase. A purpose of announce may be for resource discovery. Having the announced resources under a centralized place may optimize resource discovery. For example, a GET request for <sclBase1>./announcedTo may retrieve the the announced resources (e.g., all announced resources). If the requestor needs to get any specific announced-to resource, they may be stored under different types. Announced-to resources may have search string attributes that may be used to find certain resources. FIG. 10 illustrates an exemplary resource structure to store announced-to resources. Referring to FIG. 10, an announced-to resource from Application 1 may be retrieved from <sclBase1>/announcedTo/applicationAnnc/application1Annc.

Attributes for announced-to resources may be provided. An announced resource may comprise a link back to the original resource (e.g., see FIG. 4) as well as searchStrings that may assist discovery of the original resource. The announced resource may include additional attributes, e.g., as indicated by the symbol ("*") shown in the following table. In cases where propagation is permitted, announcement attributes of the original resource may be included in the announced resource.

TABLE 4

| AttributeName | Mandatory/Optional | Type | Description |
|---|---|---|---|
| link | M | WO | The reference to the resource that is announced here |
| accessRightID | O | RW | Same as the accessRightId of the announced resource (indicated by the link). |
| searchStrings | M | RW | Same as the searchStrings of the announced resource (indicated by the link). |
| * expirationTime | M | RW | The expiration time of the announced resource - may be different from the original resource. |
| * announcedTo | M | RO | Mandatory if propagation is allowed - otherwise may not be needed. List of the SCLS where this resource announcement is propagated |
| * propagation | O | RW | Optional flag may denote whether the announcement can be propagated by the announced-to SCL to additional SCLs. |
| * propagationCount | M | RW | Mandatory if propagation is allowed - otherwise may not be needed. The number of hops the announcement can be propagated. Each time an SCL propagates a resource, it creates an announced resource with a decremented (by one) propagationCount. |

Updates on Announce/Deannounce may be provided. Procedures to announce resources may be used to announce a resource to the potential Announced-to SCLs, and may be split between interaction on the mIa/dIa and interaction on the mId. A resource that has a searchString and can be addressed by an URI may be announced. An SCL may announce a resource to SCLs to which it has registered and which are able to accept the announcement request.

Procedures to Announce on dIa/mIa may be provided that may specify an issuer as being an application (DA, GA, NA) that may request to announce a resource to other SCLs by changing the appropriate attributes of this resource. The trigger of the announce procedure may be a registration of the Issuer to its Local SCL, the creation of a new resource(s) on the Local SCL, the update of a resource(s) on the Local SCL, and the like.

The issuer may provide an announce attribute list detailing the type of announcement it is requesting, if any. The attribute list may indicate one or more of the following: the lifetime of the announced resource; the scope of the announcement (e.g., if the announcement is to be made to specific SCLs, or if this decision is left to the local SCL); whether the announce operation needs to be confirmed to the issuer; or announcement enabled (e.g., either ACTIVE or INACTIVE), which may allow the attribute list to be populated, but without performing the announcement. The attribute list may be provided by an application, for example: at registration, and, applicable to the resources created by the issuer on its Local SCL; and/or for each resource created by the issuer on the Local SCL.

The issuer may modify the announce attribute list using an UPDATE to the resource. The attribute list for announce may require changes to the resource structure. The resource structure may include fields mentioned above in addition to its current definition. The "announcedTo" attribute may be distributed under a specific sub-resource: application, group, container, access rights, etc.

A local SCL may validate the received request. The local SCL may trigger an Announce on mId procedure, in the instance when the issuer is authorized to perform the received request according to the accessRights. The Local SCL may return a generic response.

Procedures to Announce on mId may be provided that may specify a hosting SCL. Based on an announce attribute list, the Hosting SCL may announce a resource to the Announced-to SCL on mId using CREATE. The Hosting SCL may form a representation of the resource and may send an "announce resource" request to the Announced-to SCL that may include this representation, the identity of the Hosting SCL, the search strings, the expiration time, and the like. The Hosting SCL may be able to announce the same resource to multiple SCLs. Unless specified in the announce attribute list, the Hosting SCL may decide to which SCLs to announce to.

An Announced-to SCL may validate the received request and may create an announced resource with the specified attributes. Creation may be allowed in the instance where the Hosting SCL is authorized to create a child resource according to the accessRight defined. If the creation is successful, the Announced-to SCL may return a successful response to the Hosting SCL, which may include an identifier (e.g., URI) of the created Announced Resource. If the creation is not successful, the Announced-to SCL may return an appropriate error message. Generic responses may be provided.

There may be alternatives for the Response message as follows. When the issuer is an application and it does not indicate to which SCLs to announce to, the Hosting SCL may send a response to the Issuer upon receiving the request, indicating that the request is accepted by the Hosting SCL. The Hosting SCL may decide when and to which SCLs to announce to. When the issuer is an application and it indicates to which SCLs to announce to, the Hosing SCL may respond after it has completed announcing the resource, thereby providing the issuer an indication of the status of the announced resources (e.g., as shown in FIG. 11).

Multiple confirmations may be handled in case of failure by announcement to K SCLs. A timer may start and wait for the confirmations. At timer expiry, the confirmations may be combined into a single response and/or announcements may be acknowledged separately. For failed announcements, a hosting SCL may continue to try to announce periodically. A hosting SCL may send back a NACK and have the application decide a next course of action. This may be based on some threshold (or percentage of successful announcements) or some prioritized list of announcements (e.g., if one SCL is more important to announce to). The announce request may indicate that no confirmation is required, in which case a response may not need to be sent. In the case that the issuer may want to know to which SCLs the resource is announced to, it may subscribe to the announce event.

Figure 11:
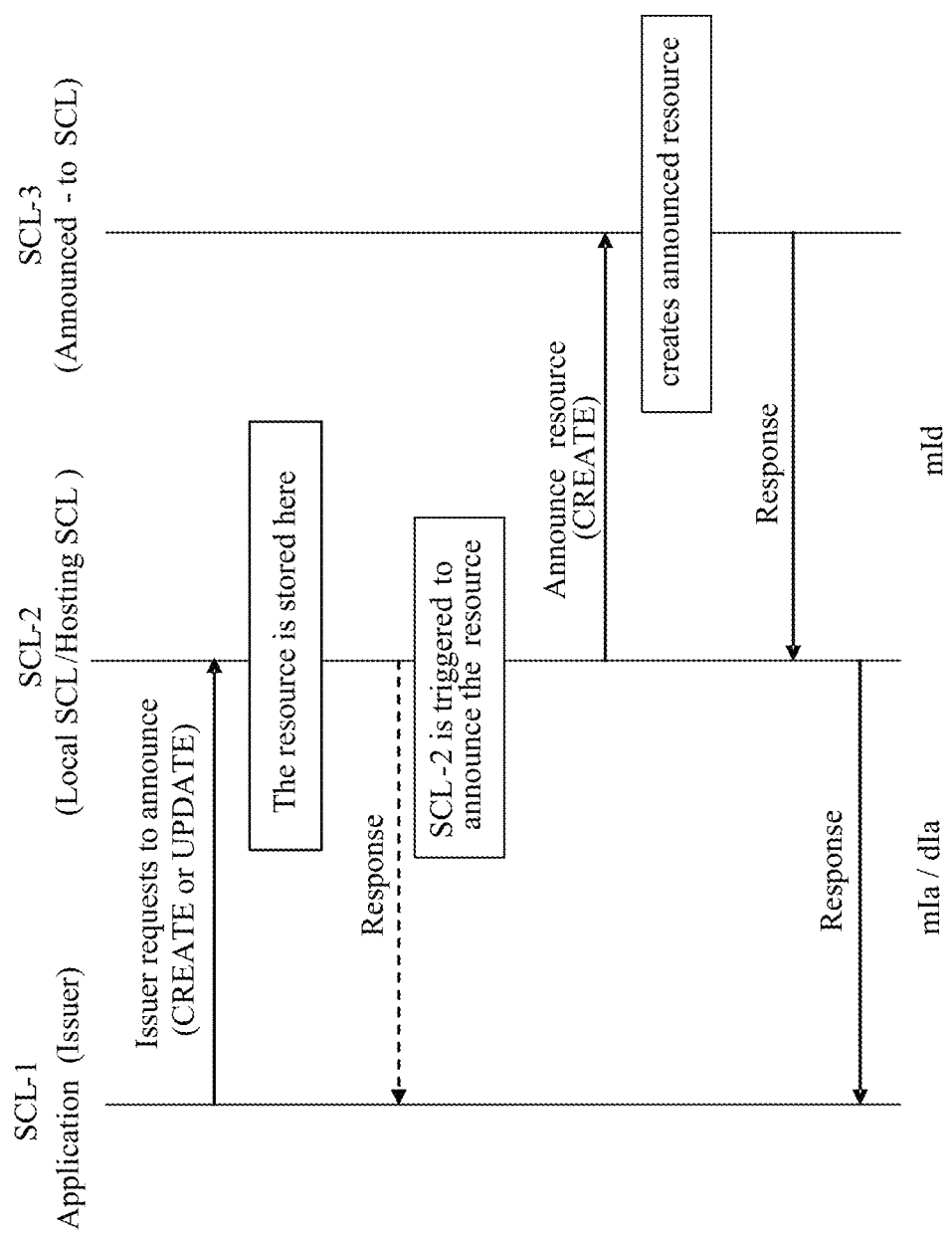
FIG. 11 illustrates an exemplary call flow to announce resources.

FIG. 11 illustrates an exemplary call flow to announce resources. Referring to FIG. 11, an application may issue a request to announce to SCL-2, which may be a local SCL and/or a hosting SCL. The resource may be stored at SCL-2. A response may be provided to the application. In response, SCL-2 may be triggered to announce the resource and send an announce resource message to SCL-3, which may respond as shown.

Figure 12:
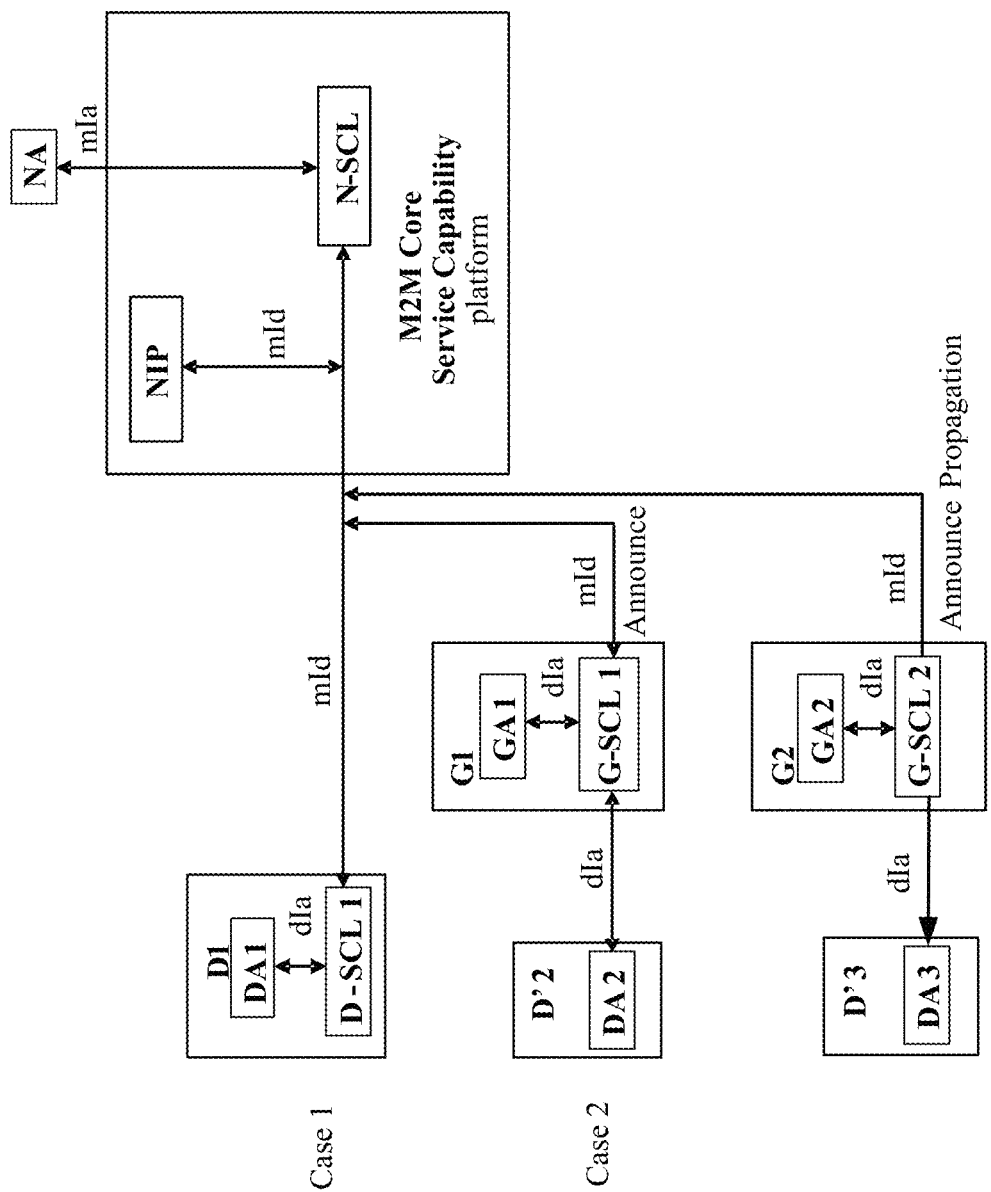
FIG. 12 illustrates an exemplary call flow to propagate an announced resource.

There may be scenarios in which an announced resource may need to be propagated to assist resource discovery. For example, FIG. 12 illustrates an exemplary diagram of a use case to propagate an announced resource. Referring to FIG. 12, G-SCL1 is the Local SCL (e.g., registration SCL) for D' type device called D'2 and the Hosting SCL for DA2. G-SCL1 may announce the resource of DA2 to N-SCL so N-SCL may be the first announced-to SCL. N-SCL may propagate the announced resource to G-SCL2 (which may assume that G-SCL2 is registered to N-SCL). Since N-SCL is the core, it may have good knowledge regarding access right and security and about to whom it can propagate. G-SCL2 may then become the second announced-to SCL. With this mechanism, DA3 may discover a resource in G-SCL1. If the above mechanism is agreed, the following may be included in the announce procedure.

The Announced-to SCL may propagate an Announced Resource to other SCLs that it is connected to. If permitted, the Announced-to SCL may propagate the Announced Resource to other SCLs. The Announced-to SCL may take a portion of the attributes of an Announced Resource and propagate a simplified announced resource. To avoid loop creation of announced resources, the announced resource may have an attribute that includes a list of "announced-to SCLs."

Figure 13:
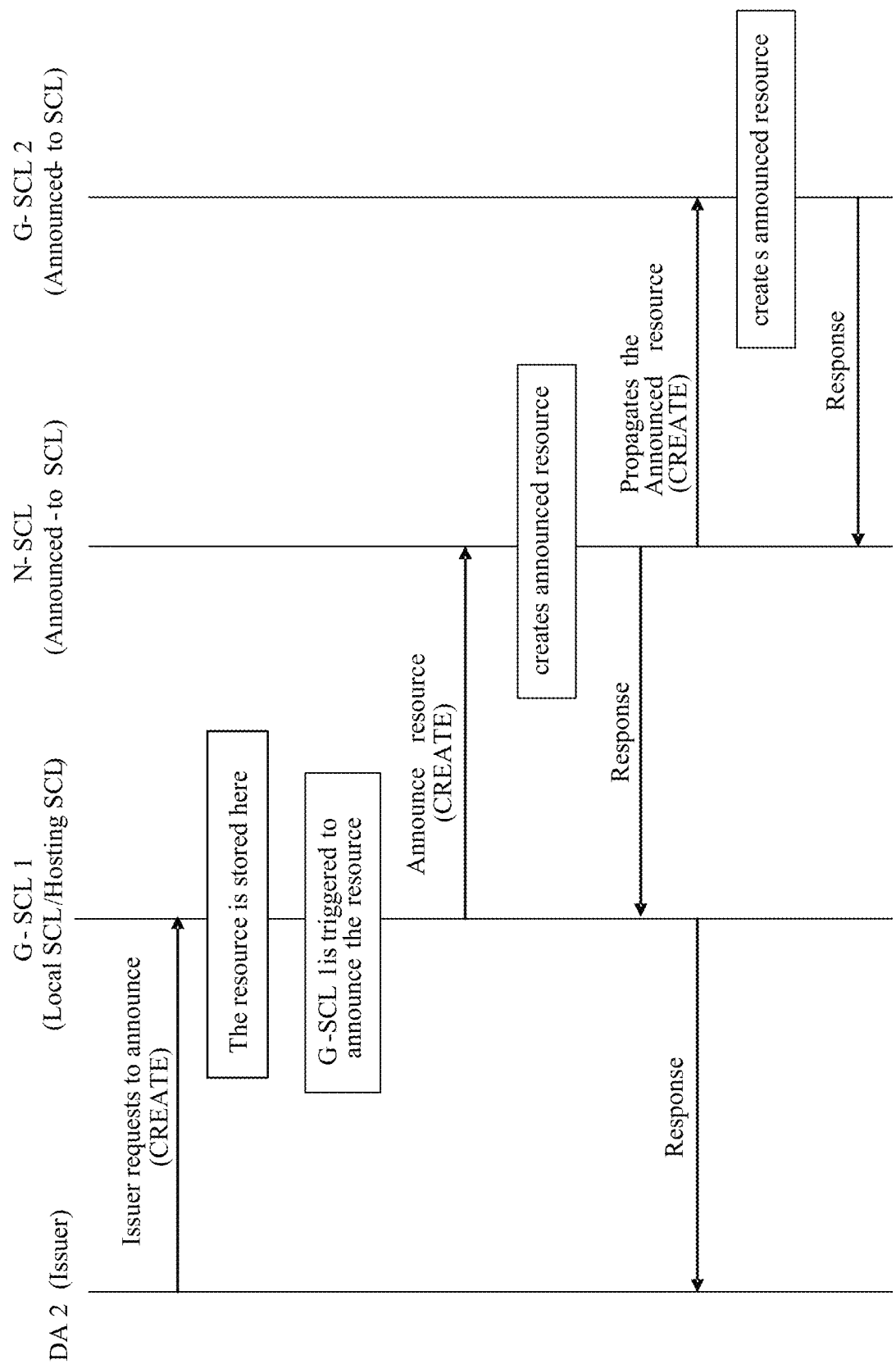
FIG. 13 illustrates an exemplary call flow to propagate an announced resource.

FIG. 13 illustrates an exemplary call flow for propagating an announced resource. The Issuer (e.g., DA2) may request to announce, which may trigger G-SCL1 to announce the resource. N-SCL may create the announced resource and propagate the announced resource as shown.

Procedures to update announced resources may be provided, which may update a previously announced resource. The update may occur on the mId interface, or it may involve the dIa/mIa interface when a change in the original resource results in a change of the announced resource.

Procedures to update announced resources on dIa/mIa may be provided that may specify that when an application requests changes in its created resource on the Local SCL (Hosting SCL), this may trigger the Hosting SCL to update an announced resource. This update may be needed when the searchStrings, accessRightID, or URI of the original resource changes. For example, there may be a content change in the original resource, and this may cause a change of searchStrings in an announced resource.

Procedures to update announced resources on mId may be provided that may specify that an issuer (Hosting SCLs) may compose a request message to update an announced resource using the UPDATE verb on the mId interface. The Hosting SCL that announced the resource previously may need to be the entity that updates the announced resource.

An Announced-to SCL may update the announced resource according to the request. If the update of the announced resource succeeded, it may return the success code to the Issuer (Hosting SCL). Otherwise, it may return an error code.

Figure 14:
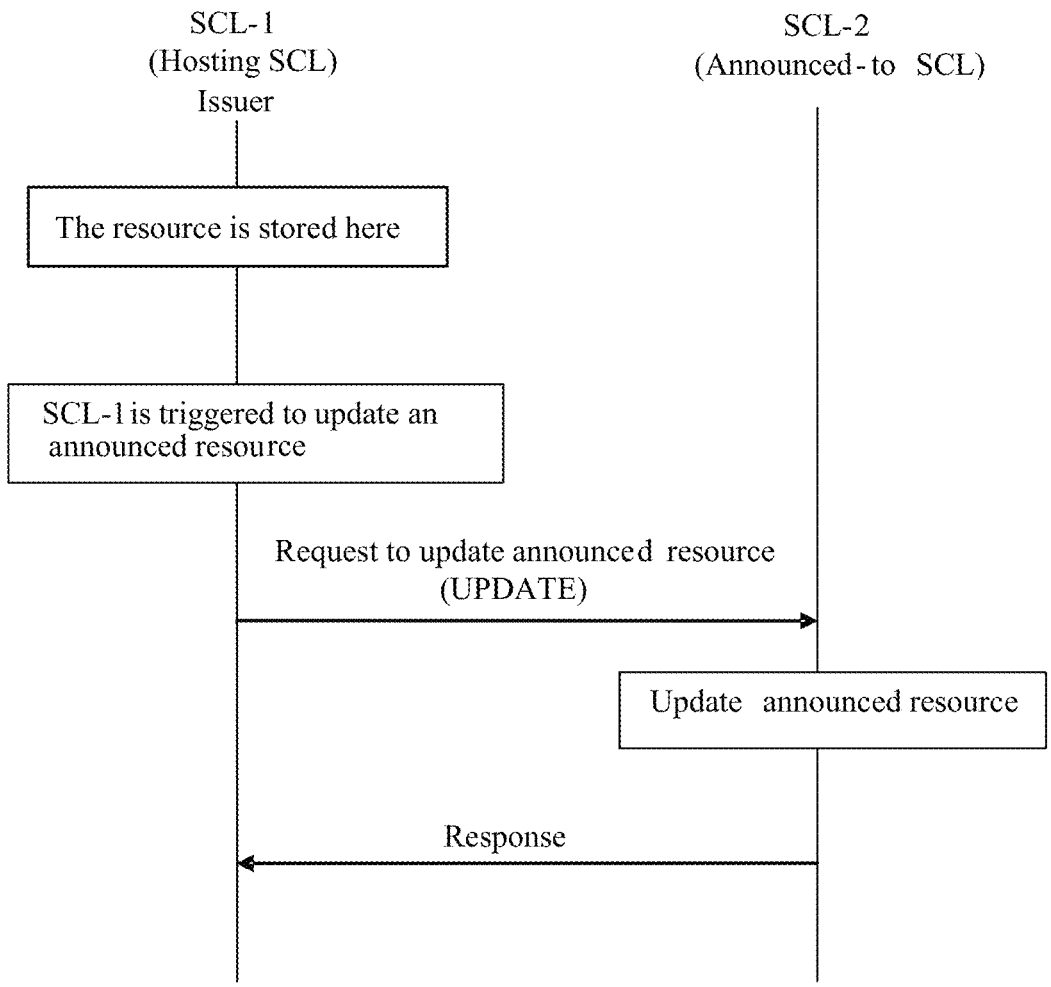
FIG. 14 illustrates an exemplary call flow to update an announced resource.

FIG. 14 illustrates an exemplary call flow diagram to update an announced resource. In the example of FIG. 14, the Issuer may be the Hosting SCL, and, actions taken are as shown.

Procedures to De-Announce Resources may be provided that may specify to de-announce a previously announced resource. De-announce may be implicit if the Announced Resource has an expiration time. De-announcing a previously announced resource may not have an impact on the original resource.

Procedures to De-Announce on dIa/mIa may be provided that may specify an issuer (e.g., application DA, GA, NA) that may request to de-announce previously announced resources. Triggers of de-announce may be that the Issuer performed an update or delete to the original resource.

Figure 15:
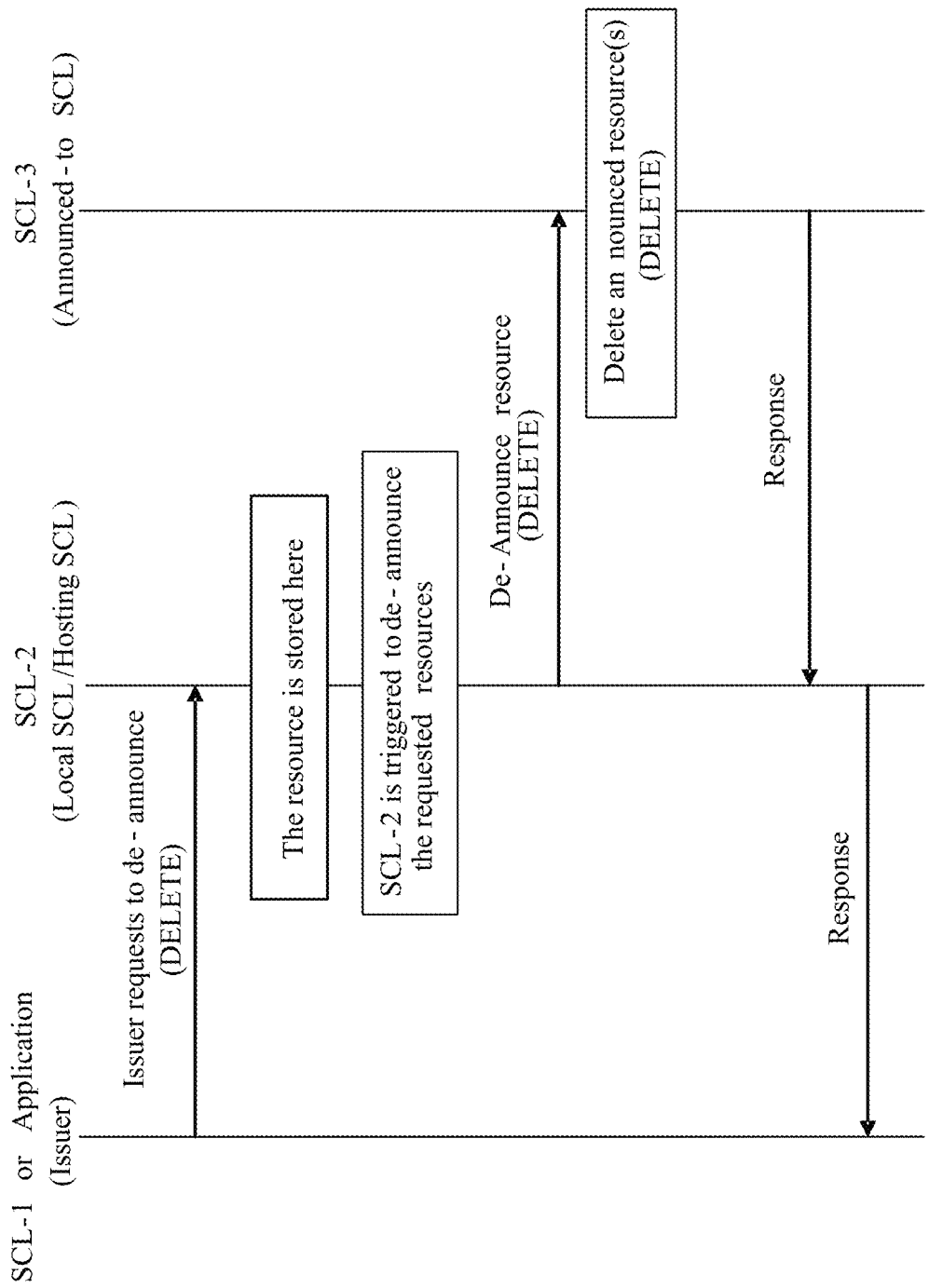
FIG. 15 illustrates an exemplary call flow to de-announce resources.

A Local SCL may validate the received request. It may trigger a De-Announce on mId procedure, if the issuer is authorized to perform the received request according to the accessRights. The Local SCL may return a generic response to the Issuer. The Local SCL may respond to the De-Announce request without waiting for the results from the mId interface. If De-Announce is triggered by the deletion of the original resource, the Local SCL may use this way of response since the original resource may not be available anymore after the mId De-Announce is completed. The Hosting SCL may respond after it has completed de-announcing the resource on mId, thereby providing the issuer an indication as to the status of the de-announced resources (e.g., as shown in FIG. 15).

Procedures to De-Announce on mId may be provided that may specify a hosting SCL that may decide to De-Announce a resource as a result of an expiration of the announcement, or based on triggers from the Issuer (e.g., change of announce attribute list), etc. The Hosting SCL may send a "De-Announce" request message using DELETE over the mId interface, to the Announced-to SCL to de-announce a previously announced resource. In the De-Announce request, the Hosting SCL may indicate one or multiple announced resources. It may be the responsibility of the Hosting SCL to delete the announced resources.

An Announced-to SCL may validate the received request and it may delete the announced resource(s) with the specified attributes. Deletion may be allowed if the Hosting SCL is authorized to delete a child resource according to the accessRight defined. If the deletion is successful, the Announced-to SCL may return a successful response to the Hosting SCL. If the deletion is not successful the Announced-to SCL may return an appropriate error message.

De-Announce may be implicit if the Announced Resource has an expiration time. A response message may be sent to the Hosting SCL (announcing SCL) to indicate that the announced resource is de-announced. In a case when the Hosting SCL (announcing SCL) is not server capable, the subscription mechanism may be used.

FIG. 15 illustrates an exemplary call flow to de-announce resources. The Issuer may request to de-announce a resource, which may trigger SCL-2 to de-announce the requested resource. SCL-2 may delete the resource and send a de-announce resource request to SCL-3, which may delete the resource. Responses may be shown as indicated.

If it is agreed that an announced resource can be propagated, the following procedure may be used: if the Announced-to SCL propagated the announced resource to other SCLs, it may also propagate the De-announce request to De-announce the resources.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A gateway comprising:
   a transceiver; and
   a processor, wherein:
   the transceiver and the processor are configured to receive a request from a first entity to create a locally announced resource of an original resource, wherein the request includes at least one target entity where the locally announced resource is to be announced;
   the transceiver and the processor are further configured to announce the locally announced resource to the at least one target entity;
   the transceiver and the processor are further configured to receive a request from an issuer to access the locally announced resource of the original resource;
   the processor is further configured to determine that the original resource of the locally announced resource is provided by a second entity;
   the processor is further configured to determine that the issuer has access rights to access the locally announced resource of the original resource by verifying the issuer against access rights of the locally announced resource;
   the processor is further configured to determine a uniform resource identifier (URI) of the original resource using a URI attribute of the locally announced resource;

the transceiver and the processor are further configured to issue a request to retrieve the original resource from the second entity based on the URI of the original resource;

the transceiver and the processor are further configured to receive a response from the second entity that comprises content of the original resource; and the transceiver and the processor are further configured to respond to the issuer with the content of the original resource.

2. The gateway of claim 1, wherein the transceiver and the processor are further configured to respond to the issuer with the content of the original resource on a condition that the issuer has access rights to the locally announced resource.

3. The gateway of claim 1, wherein transceiver and the processor are further configured to respond to the issuer, on a condition that the issuer has access rights to the locally announced resource, by sending the URI to the issuer.

4. The gateway of claim 1, wherein the second entity is hosted by a device.

5. The gateway of claim 1, wherein the second entity is hosted by a server.

6. The gateway of claim 1, wherein the first entity resides on a server.

7. The gateway of claim 1, wherein the first entity resides on a device.

8. The gateway of claim 1, wherein the locally announced resource further comprises an expiration time that indicates when the locally announced resource can no longer be used.

9. The gateway of claim 1, wherein the locally announced resource further comprises an access rights identity of the second entity.

10. The gateway of claim 1, wherein the gateway is a service capability layer (SCL).

11. The gateway of claim 1, wherein the transceiver and the processor are further configured to indicate to the second entity a maximum number of service capability layers (SCLs) that the request may propagate to.

12. A method, implemented by a gateway, the method comprising:

receiving a request from a first entity to create a locally announced resource of an original resource, wherein the request includes at least one target entity where the locally announced resource is to be announced;

announcing the locally announced resource to the at least one target entity;

receiving a request from an issuer to access the locally announced resource of the original resource;

determining that the original resource of the locally announced resource is provided by a second entity;

determining that the issuer has access rights to access the locally announced resource of the original resource by verifying the issuer against access rights of the locally announced resource;

determining a uniform resource identifier (URI) of the original resource using a URI attribute of the locally announced resource;

issuing a request to retrieve the original resource from the second entity based on the URI of the original resource;

receiving a response from the second entity that comprises content of the original resource; and responding to the issuer with the content of the original resource.

13. The method of claim 12, further comprising responding to the issuer with the content of the original resource on a condition that the issuer has access rights to the locally announced resource.

14. The method of claim 12, further comprising responding to the issuer on a condition that the issuer has access rights to the locally announced resource by sending the URI to the issuer.

15. The method of claim 12, wherein the second entity is hosted by a device or a server.

16. The method of claim 12, wherein the first entity resides on a server or a device.

17. The method of claim 12, wherein the locally announced resource further comprises an expiration time that indicates when the locally announced resource can no longer be used.

18. The method of claim 12, wherein the locally announced resource further comprises an access rights identity of the second entity.

19. The method of claim 12, wherein the gateway is a service capability layer (SCL).

20. The method of claim 12, further comprising indicating to the second entity a maximum number of service capability layers (SCLs) that the request may propagate to.

21. A network entity comprising:

a transceiver; and a processor, wherein:

the transceiver and the processor are configured to receive a request from a first entity to create a locally announced resource of an original resource, wherein the request includes at least one target entity where the locally announced resource is to be announced;

the transceiver and the processor are further configured to announce the locally announced resource to the at least one target entity;

the transceiver and the processor are further configured to receive a request from an issuer to access the locally announced resource of the original resource;

the processor is further configured to determine that the original resource of the locally announced resource is provided by a second entity;

the processor is further configured to determine that the issuer has access rights to access the locally announced resource of the original resource by verifying the issuer against access rights of the locally announced resource;

the processor is further configured to determine a uniform resource identifier (URI) of the original resource using a URI attribute of the locally announced resource;

the transceiver and the processor are further configured to issue a request to retrieve the original resource from the second entity based on the URI of the original resource;

the transceiver and the processor are further configured to receive a response from the second entity that comprises content of the original resource; and the transceiver and the processor are further configured to respond to the issuer with the content of the original resource.

22. The network entity of claim 21, wherein the transceiver and the processor are further configured to respond to the issuer with the content of the original resource on a condition that the issuer has access rights to the locally announced resource.

23. The network entity of claim 21, wherein transceiver and the processor are further configured to respond to the issuer, on a condition that the issuer has access rights to the locally announced resource, by sending the URI to the issuer.

24. The network entity of claim 21, wherein the second entity is hosted by a device.

25. The network entity of claim 21, wherein the second entity is hosted by a gateway.

26. The network entity of claim 21, wherein the first entity resides on a gateway.

27. The network entity of claim 21, wherein the first entity resides on a device.

28. The network entity of claim 21, wherein the locally announced resource further comprises an expiration time that indicates when the locally announced resource can no longer be used.

29. The network entity of claim 21, wherein the locally announced resource further comprises an access rights identity of the second entity.

30. The network entity of claim 21, wherein the network entity is a service capability layer (SCL).

31. The network entity of claim 21, wherein the network entity is a server.

32. The network entity of claim 21, wherein the transceiver and the processor are further configured to indicate to the second entity a maximum number of service capability layers (SCLs) that the request may propagate to.

33. A method, implemented by a network entity, the method comprising:

receiving a request from a first entity to create a locally announced resource of an original resource, wherein the request includes at least one target entity where the locally announced resource is to be announced;

announcing the locally announced resource to the at least one target entity;

receiving a request from an issuer to access the locally announced resource of the original resource;

determining that the original resource of the locally announced resource is provided by a second entity;

determining that the issuer has access rights to access the locally announced resource of the original resource by verifying the issuer against access rights of the locally announced resource;

determining a uniform resource identifier (URI) of the original resource using a URI attribute of the locally announced resource;

issuing a request to retrieve the original resource from the second entity based on the URI of the original resource;

receiving a response from the second entity that comprises content of the original resource; and responding to the issuer with the content of the original resource.

34. The method of claim 33, further comprising responding to the issuer with the content of the original resource on a condition that the issuer has access rights to the locally announced resource.

35. The method of claim 33, further comprising responding to the issuer on a condition that the issuer has access rights to the locally announced resource by sending the URI to the issuer.

36. The method of claim 33, wherein the second entity is hosted by a device or a gateway.

37. The method of claim 33, wherein the first entity resides on a gateway or a device.

38. The method of claim 33, wherein the locally announced resource further comprises an expiration time that indicates when the locally announced resource can no longer be used.

39. The method of claim 33, wherein the locally announced resource further comprises an access rights identity of the second entity.

40. The method of claim 33, wherein the network entity is a service capability layer (SCL).

41. The method of claim 33, further comprising indicating to the second entity a maximum number of service capability layers (SCLs) that the request may propagate to.

42. The method of claim 33, wherein the network entity is a server.

* * * * *